United States Patent
Onoue et al.

(10) Patent No.: US 10,428,894 B2
(45) Date of Patent: Oct. 1, 2019

(54) RESIN-MADE IMPACT ABSORPTION MEMBER AND VEHICULAR COMPONENT

(71) Applicant: Teijin Limited, Osaka-Shi, Osaka (JP)

(72) Inventors: Shuhei Onoue, Osaka (JP); Tadashi Yamaji, Osaka (JP); Keizo Yokoyama, Osaka (JP); Kohei Oka, Osaka (JP)

(73) Assignee: Teijin Limited, Osaka-Shi, Osaka (JP)

( * ) Notice: Subject to any disclaimer, the term of this patent is extended or adjusted under 35 U.S.C. 154(b) by 90 days.

(21) Appl. No.: 15/116,582

(22) PCT Filed: Feb. 5, 2015

(86) PCT No.: PCT/JP2015/053274
§ 371 (c)(1),
(2) Date: Aug. 4, 2016

(87) PCT Pub. No.: WO2015/119206
PCT Pub. Date: Aug. 13, 2015

(65) Prior Publication Data
US 2016/0356334 A1    Dec. 8, 2016

(30) Foreign Application Priority Data

Feb. 6, 2014 (JP) .................. 2014-021453
Mar. 14, 2014 (JP) .................. 2014-052051
Mar. 14, 2014 (JP) .................. 2014-052052

(51) Int. Cl.
*F16F 7/12* (2006.01)
*B62D 21/15* (2006.01)
(Continued)

(52) U.S. Cl.
CPC ............. *F16F 7/124* (2013.01); *B60R 19/03* (2013.01); *B60R 19/34* (2013.01); *B62D 21/152* (2013.01); *B62D 25/04* (2013.01); *B62D 29/04* (2013.01)

(58) Field of Classification Search
CPC .......... F16F 7/124; B60R 19/03; B60R 19/34; B62D 29/04; B62D 21/152; B62D 25/04
See application file for complete search history.

(56) References Cited

U.S. PATENT DOCUMENTS 4,227,593 A * 10/1980 Bricmont ............... F16F 7/121
                                                     188/377
4,685,241 A *  8/1987 Foote .................... A01K 87/00
                                                     156/166
(Continued)

FOREIGN PATENT DOCUMENTS

JP         1136737 A  *  5/1989
JP     H02-175452 A      7/1990
(Continued)

OTHER PUBLICATIONS

Jan. 24, 2017—(EP) Office Action—App 15747039.4.
(Continued)

*Primary Examiner* — Melody M Burch
(74) *Attorney, Agent, or Firm* — Banner & Witcoff, Ltd.

(57) ABSTRACT

Provided is a resin-made impact absorption member including: an impact absorption portion which includes a fiber-reinforced resin material containing reinforcing fibers and a thermoplastic resin and has a hollow structure including an outer cylindrical portion and a hollow portion, in which the reinforcing fiber has an average fiber length of 1 mm to 100 mm, the thermoplastic resin has a fracture elongation of 10% or more, the fiber-reinforced resin material has a compressive elastic modulus of 10 GPa or more and a compressive strength of 150 MPa to 500 MPa, and in the impact absorption portion, a maximum value of a ratio L1/t1 of a distance L1 from a position of the center of gravity to the outer cylindrical portion on a same section in a sectional shape in a direction orthogonal to an impact absorption (Continued)

direction, to a thickness t1 of the outer cylindrical portion, is 40 or less.

12 Claims, 19 Drawing Sheets

(51) Int. Cl.
    *B60R 19/34*     (2006.01)
    *B62D 29/04*     (2006.01)
    *B60R 19/03*     (2006.01)
    *B62D 25/04*     (2006.01)

(56) References Cited

U.S. PATENT DOCUMENTS

| | | | |
|---|---|---|---|
| 5,264,259 A * | 11/1993 | Satoh | B60R 19/34 |
| | | | 114/219 |
| 5,462,144 A * | 10/1995 | Guardiola | B61F 1/08 |
| | | | 105/416 |
| 5,551,673 A | 9/1996 | Furusawa et al. | |
| 5,636,866 A * | 6/1997 | Suzuki | B60R 21/04 |
| | | | 188/376 |
| 6,085,878 A * | 7/2000 | Araki | F16F 7/121 |
| | | | 188/371 |
| 7,195,815 B1 | 3/2007 | Harada et al. | |
| 9,242,612 B2 | 1/2016 | Kawamata et al. | |
| 2003/0087079 A1 | 5/2003 | Okabe et al. | |
| 2004/0206017 A1 | 10/2004 | Dajek et al. | |
| 2005/0147804 A1 | 7/2005 | Harada et al. | |
| 2005/0281999 A1 | 12/2005 | Hofmann et al. | |
| 2006/0150538 A1* | 7/2006 | Thomas | E04H 9/02 |
| | | | 52/167.3 |
| 2006/0202493 A1* | 9/2006 | Tamura | F16F 7/12 |
| | | | 293/133 |
| 2007/0202314 A1 | 8/2007 | Youn et al. | |
| 2008/0071015 A1* | 3/2008 | Kiuchi | C08K 3/22 |
| | | | 524/261 |
| 2010/0266827 A1* | 10/2010 | Oyama | C08J 5/042 |
| | | | 428/219 |
| 2011/0162777 A1 | 7/2011 | Youn et al. | |
| 2014/0292007 A1 | 10/2014 | Kawamata et al. | |

FOREIGN PATENT DOCUMENTS

| | | |
|---|---|---|
| JP | H06-264949 A | 9/1994 |
| JP | H07-269622 A | 10/1995 |
| JP | H08-219215 A | 8/1996 |
| JP | 2001-088235 A | 4/2001 |
| JP | 2001-293829 A | 10/2001 |
| JP | 2005-001462 A | 1/2005 |
| JP | 2005-145378 A | 6/2005 |
| JP | 2005-193755 A | 7/2005 |
| JP | 2005-195155 A | 7/2005 |
| JP | 2005-225364 A | 8/2005 |
| JP | 2005-247096 A | 9/2005 |
| JP | 2006-519908 A | 8/2006 |
| JP | 2008121799 A * | 5/2008 |
| JP | 2012-087849 A | 5/2012 |
| WO | 2005105435 A1 | 11/2005 |
| WO | 2013-024883 A1 | 2/2013 |
| WO | 2013-027559 A1 | 2/2013 |

OTHER PUBLICATIONS

Jan. 12, 2017—(EP) Supplemental Search Report—App 15747039.4.
May 12, 2015—(PCT/JP)—Written Opinion of the ISR—App 2015/053274—Eng Tran.
May 12, 2015—International Search Report—Intl App PCT/JP2015/053274.
Sep. 5, 2017—(JP) Office Action—App 2014-052052 (including concise English statement of relevance).
Sep. 5, 2017—(JP) Office Action—App 2014-052051 (including concise English statement of relevance).
Sep. 5, 2017—(JP) Office Action—App 2014-021453 (including concise English statement of relevance).

* cited by examiner

RESIN-MADE IMPACT ABSORPTION MEMBER AND VEHICULAR COMPONENT

CROSS REFERENCE TO RELATED APPLICATIONS

This is a U.S. National Phase Application under 35 U.S.C. § 371 of International Application No. PCT/JP2015/053274, filed Feb. 5, 2015, which claims priority to Japanese Application Nos. 2014-021453, filed Feb. 6, 2014, 2014-052051, filed Mar. 14, 2014, and 2014-052052, filed Mar. 14, 2014, the entire contents of which are incorporated herein by reference.

TECHNICAL FIELD

The present invention relates to a resin-made impact absorption member which includes a fiber-reinforced resin material containing reinforcing fibers and a thermoplastic resin, and more specifically to a resin-made impact absorption member which includes a fiber-reinforced resin material containing reinforcing fibers having a specific average fiber length and a thermoplastic resin having a specific fracture elongation, and having a specific compressive elastic modulus and compressive strength, and which has a hollow structure having a specific shape that is appropriate for impact absorption.

BACKGROUND ART

On a front side or a rear side of a vehicle, in order to prevent the impact during collision from being directly transmitted to a passenger, for example, there are many cases where an impact absorption member, such as a crush box, a front side member, or a rear side member, is provided. The impact absorption member is generally composed of a metal material in the related art. As a structure of the metal-made impact absorption member, for example, a structure in which a steel material is press-molded, which is formed in a shape of a box by spot welding, and which is provided with a recessed portion that becomes a starting point of buckling, is generally used (for example, Patent Document 1). In addition, a structure which forms a shape of a box by using an extruded material of aluminum instead of a steel material from the viewpoint of reduction of weight, which is provided with a recessed portion that becomes a starting point of buckling by post-processing, and which is further provided with an attaching portion attached to other components by welding, is known (for example, Patent Document 2). In recent years, in order to improve fuel efficiency, it is desired to reduce the weight of the vehicle, and research on an impact absorption member made of resin has been flourishing (for example, Patent Document 3). Since the resin-made impact absorption member uses a light resin material instead of the metal material in the related art, it is advantageous that substantial reduction of weight of the resin-made impact absorption member can be achieved, and means for achieving further reduction of weight of a vehicle structure is expected.

In the resin-made impact absorption member, in order to obtain stable impact absorption performance, a structure of the impact absorption member is designed so that a load which the impact absorption member receives becomes constant with respect to the modification. For example, in Patent Document 4, a receiving member which has a tapered outer cylindrical surface having a tapered angle, and an impact absorption member fitted to be frictionally engageable with a cylindrical member, are disclosed. In addition, in Patent Document 5, a fiber-reinforced resin-made impact absorption member which changes a sectional shape in the direction orthogonal to the impact absorption direction toward the impact absorption direction, is disclosed. Furthermore, in Patent Document 6, a fiber-reinforced resin-made impact absorption member in which the member thickness on the opposite side to an impact input side is greater than the member thickness on the impact input side, and in which a tip end of an input portion protrudes further outside than an outer circumferential surface, is disclosed. However, there are many cases where the impact absorption members disclosed in each Patent Document have especially complicated structures, and there is a case where a manufacturing method becomes complicated or the use thereof becomes restricted.

Meanwhile, research on obtaining stable impact absorption performance not by making the structure of the impact absorption appropriate, but by making the resin material which constitutes the impact absorption member appropriate, has been carried out. For example, in Patent Document 7, a fiber-reinforced resin-made impact absorption member in which arrangement density of a reinforcing fiber bundle is arranged to gradually increase from the input side to the other side in the impact absorption direction, is disclosed. However, even in this case, there is a case where a special manufacturing method is necessary and a manufacturing process becomes complicated.

CITATION LIST

Patent Documents

[Patent Document 1] JP-A-2-175452
[Patent Document 2] JP-A-2005-001462
[Patent Document 3] JP-A-2005-247096
[Patent Document 4] JP-A-2012-87849
[Patent Document 5] JP-A-2005-195155
[Patent Document 6] JP-A-6-264949
[Patent Document 7] JP-A-2005-193755

SUMMARY OF INVENTION

Problems to be Solved by Invention

As described above, in order to achieve stable impact absorption performance in a resin-made impact absorption member, there are problems that the structure of the impact absorption member or the resin material which constitutes the impact absorption member becomes complicated, and the manufacturing method of the impact absorption member becomes complicated, and further, the use of the impact absorption member is restricted.

The present invention has been made considering such problems, and an object of the present invention is to provide a resin-made impact absorption member which obtains stable impact absorption performance by a simple structure.

Means for Solving the Problems

In order to solve the above-described problems, the present invention provides the following means.
(1)
A resin-made impact absorption member including:
an impact absorption portion which includes a fiber-reinforced resin material containing reinforcing fibers and a thermoplastic resin and which has a hollow structure including an outer cylindrical portion and a hollow portion, in which the reinforcing fiber has an average fiber length of 1 mm to 100 mm, the thermoplastic resin has a fracture elongation of equal to or greater than 10%, the fiber-reinforced resin material has a compressive elastic modulus of equal to or greater than 10 GPa and a compressive strength of 150 MPa to 500 MPa, and in which, in the impact absorption portion, a maximum value of a ratio $L1/t1$ of a distance $L1$ from a position of the center of gravity to the outer cylindrical portion on a same section in a sectional shape in a direction orthogonal to an impact absorption direction, to a thickness $t1$ of the outer cylindrical portion, is equal to or less than 40.

(2)

The resin-made impact absorption member according to (1),

In which the sectional shape in the direction orthogonal to the impact absorption direction of the impact absorption portion is a polygon, and a maximum value of a ratio $L2/t2$ between a side length $L2$ on each side of the polygon and an average thickness $t2$ of the outer cylindrical portion which configures the side, is equal to or less than 40.

(3)

The resin-made impact absorption member according to (1) or (2), in which the impact absorption portion is configured by combining hat shapes having flange portions.

(4)

The resin-made impact absorption member according to any one of (1) to (3), in which the sectional shape in the direction orthogonal to the impact absorption direction of the impact absorption portion is a uniform shape across the entire impact absorption direction.

(5)

The resin-made impact absorption member according to any one of (1) to (4), in which the impact absorption portion includes a single fiber-reinforced resin material.

(6)

The resin-made impact absorption member according to any one of (1) to (4), in which the impact absorption portion includes the fiber-reinforced resin material, and is constituted by an impact absorption base material having a substantially constant thickness, and in which the impact absorption base material includes a plurality of thermoplastic resin base materials combined in the impact absorption direction, the thermoplastic resin base materials having different compressive strengths.

(7)

The resin-made impact absorption member according to (6), in which, in the impact absorption base material, the plurality of thermoplastic resin base materials are disposed in order of increasing the compressive strength toward a rear end side from a tip end side which receives the impact.

(8)

The resin-made impact absorption member according to (6) or (7), in which the compressive strengths of the plurality of thermoplastic resin base materials are different as volume fractions of the reinforcing fiber are different from each other.

(9)

The resin-made impact absorption member according to any one of (6) to (8), in which, in the impact absorption base material, adjacent thermoplastic resin base materials are combined so that abundance continuously changes in a thickness direction in a boundary of the adjacent thermoplastic resin base materials.

(10)

The resin-made impact absorption member according to any one of (1) to (5), in which, in the impact absorption portion, a plurality of resin shaped products which have flange portions and include the fiber-reinforced resin material, are combined to form a boundary portion as the flange portions come into contact with each other, and in which an impact absorption auxiliary portion which includes a resin material formed to cover the boundary portion, is further provided.

(11)

The resin-made impact absorption member according to (10), in which a sectional area of the impact absorption auxiliary portion in the direction perpendicular to the impact absorption direction of the impact absorption portion, is different from a sectional area in the impact absorption direction.

(12)

The resin-made impact absorption member according to (11), in which the impact absorption auxiliary portion is formed so that the sectional area increases along the impact absorption direction.

(13)

The resin-made impact absorption member according to any one of (10) to (12), in which the boundary portion is covered with the impact absorption auxiliary portion so as to have a space between an end surface of the boundary portion and an inner surface of the impact absorption auxiliary portion, at least at a part thereof.

(14)

The resin-made impact absorption member according to any one of (10) to (13), in which the flange portions which form the boundary portion are joined to each other.

(15)

A vehicular component comprises a resin-made impact absorption member according to any one of (1) to (14).

Advantageous Effects of Invention

In a resin-made impact absorption member of the present invention, it is possible to achieve stable impact absorption performance by a simple structure. In addition, since the resin-made impact absorption member of the present invention has a simple structure, manufacturing is possible without using a complicated manufacture process. Furthermore, it is possible to use the resin-made impact absorption member of the present invention for various applications.

DESCRIPTION OF EMBODIMENTS

A resin-made impact absorption member of the present invention includes: an impact absorption portion which includes a fiber-reinforced resin material containing reinforcing fibers and a thermoplastic resin and which has a hollow structure including an outer cylindrical portion and a hollow portion. The reinforcing fiber has an average fiber length of 1 mm to 100 mm, the thermoplastic resin has a fracture elongation of equal to or greater than 10%, the fiber-reinforced resin material has a compressive elastic modulus of equal to or greater than 10 GPa and a compressive strength of 150 MPa to 500 MPa. In the impact absorption portion, a maximum value of a ratio L1/t1 of a distance L1 from a position of the center of gravity to the outer cylindrical portion on a same section in a sectional shape in a direction orthogonal to an impact absorption direction, to a thickness t1 of the outer cylindrical portion, is equal to or less than 40.

By absorbing impact energy input to one end of the resin-made impact absorption member by the impact absorption portion, the resin-made impact absorption member of the present invention is used for suppressing the impact to the other end side. In addition, the resin-made impact absorption member of the present invention assumes so-called impact absorption with respect to the axial compressive direction, and is used for absorbing the impact which is received in the direction coaxial to the penetrating direction of the hollow structure of the impact absorption portion. Hereinafter, "the direction coaxial to the penetrating direction of the hollow structure of the impact absorption portion" is referred to as the "impact absorption direction".

Figure 12:
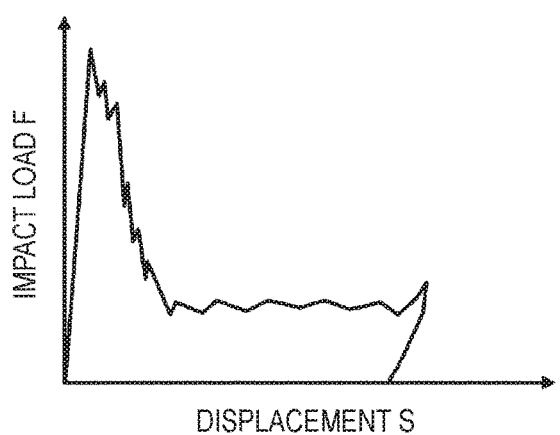
FIG. 12 is a schematic view (example of unstable impact absorption) of a curve between an impact load F and displacement S.

The impact energy input from one end of the resin-made impact absorption member of the present invention is absorbed by the impact absorption portion, but the impact absorption mechanism uses a crushing phenomenon of the impact absorption portion in the impact absorption direction. In other words, in general, when an impact is applied to the impact absorption portion, as illustrated in FIG. 12, while absorbing an impact load F, displacement S is generated due to the crushing phenomenon, and an area surrounded by the curve between the impact load F and the displacement S becomes an absorbed impact energy amount. The crushing phenomenon is made of a compression failure in the impact absorption direction, and a buckling phenomenon generated according thereto. However, by the buckling phenomenon, as illustrated in FIG. 12, since the load applied after an initial impact load decreases to be lower than the initial impact load, the displacement increases for achieving the desired impact absorption. When the displacement increases, it is also necessary to increase the impact absorption portion as much as the displacement, and thus, a large displacement is not preferable. In addition, when the impact load during the impact absorption is large, the impact received by a passenger during collision increases, and thus, a large impact load is not preferable. Accordingly, in the impact absorption portion, as illustrated in FIG. 13, it is preferable that the impact load with respect to the displacement is designed to be constant so that the maximum impact load and the displacement decrease.

Figure 13:
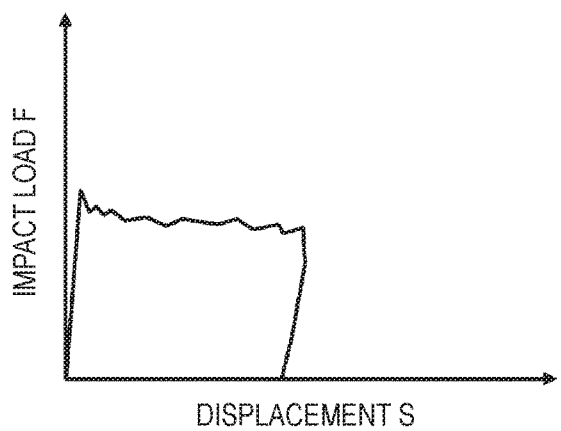
FIG. 13 is a schematic view (example of stable impact absorption) of the curve between the impact load F and the displacement S.

The "stable impact absorption performance" mentioned in the present invention illustrates a phenomenon illustrated in FIG. 13, and a main object of the present invention is to provide a resin-made impact absorption member which shows the stable impact absorption performance by a simple structure without making the impact absorption portion have a complicated structure.

In order to obtain the stable impact absorption performance described above, it is necessary to reduce a pitch (hereinafter, refer to as a "buckling pitch") of the buckling phenomenon occurred during the crushing phenomenon. Since the impact load rapidly decreases according to the buckling in a case where the buckling pitch is high, the displacement required for absorbing the desired impact energy amount increases. Therefore, in order to obtain the stable impact absorption performance, the design which repeats the low buckling pitch and does not cause a rapid decrease in the impact load, is necessary. By using the impact absorption portion which is made of the above-described specific fiber-reinforced resin member, and which has a specific hollow structure, the resin-made impact absorption member of the present invention realizes a low buckling pitch, and thus, realizes the stable impact absorption performance.

[Impact Absorption Portion]

The impact absorption portion in the present invention is made of the fiber-reinforced resin material containing the reinforcing fibers and the thermoplastic resin and has the hollow structure made of the outer cylindrical portion and the hollow portion, and the maximum value of a ratio $L1/t1$ o of a distance $L1$ from a position of the center of gravity to the outer cylindrical portion on a same section in a sectional shape in a direction orthogonal to an impact absorption direction, to a thickness $t1$ of the outer cylindrical portion, is equal to or less than 40. Here, the above-described hollow portion indicates a space in the outer cylindrical portion. In addition, in the impact absorption portion used in the present invention, the average fiber length of the reinforcing fibers is 1 mm to 100 mm, the fracture elongation of the thermoplastic resin is equal to or greater than 10%, the compressive elastic modulus of the fiber-reinforced resin material is equal to or greater than 10 GPa, and the compressive strength is 150 MPa to 500 MPa. Hereinafter, the impact absorption portion used in the present invention will be described. In addition, the fiber-reinforced resin material used in the impact absorption portion will be described later.

Figure 1:
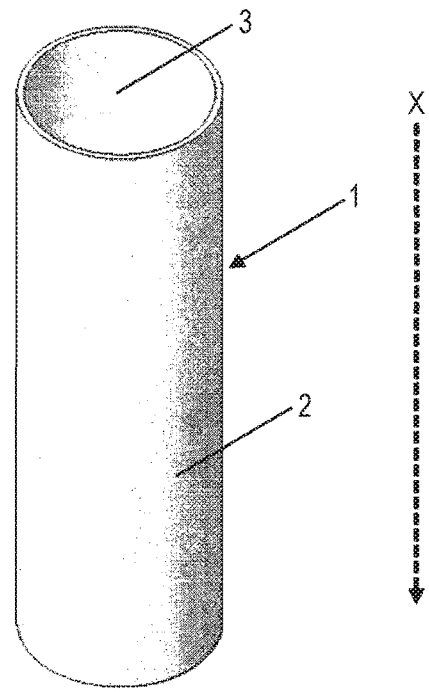
FIG. 1 is a schematic view illustrating an example (perfect circular shape) of an impact absorption portion in a resin-made impact absorption member of the present invention.
Figure 2:
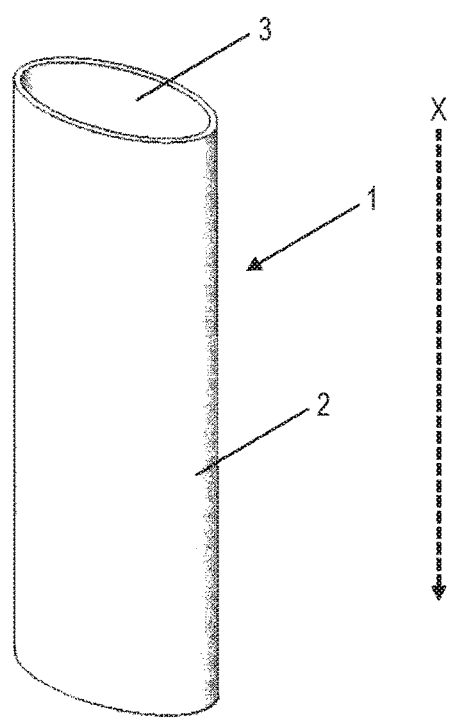
FIG. 2 is a schematic view illustrating an example (oval shape) of an impact absorption portion in a resin-made impact absorption member of the present invention.
Figure 3:
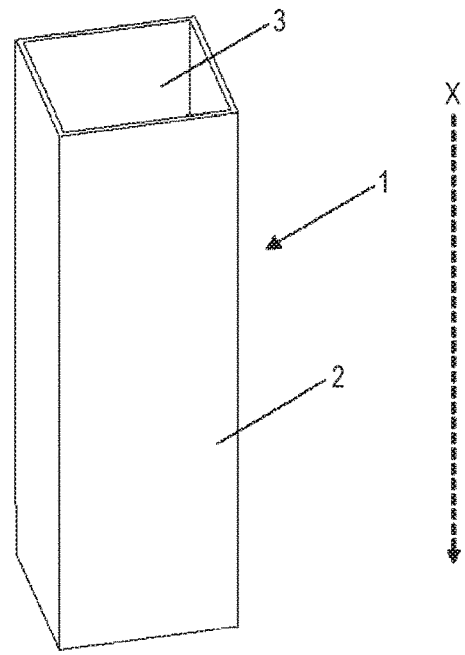
FIG. 3 is a schematic view illustrating an example (rectangular shape) of an impact absorption portion in a resin-made impact absorption member of the present invention.
Figure 4:
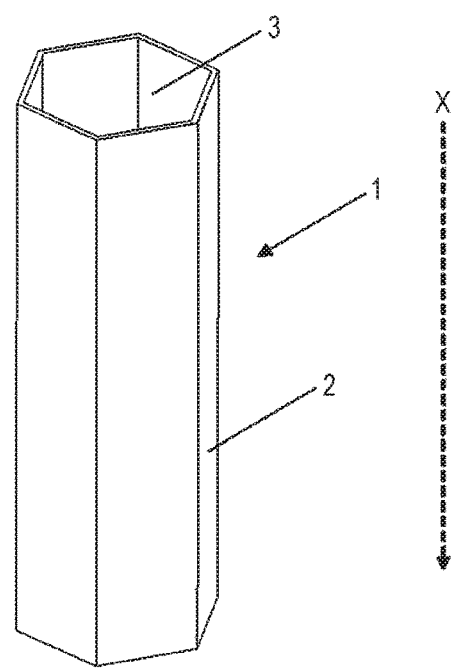
FIG. 4 is a schematic view illustrating an example (hexagonal shape) of an impact absorption portion in a resin-made impact absorption member of the present invention.
Figure 5:
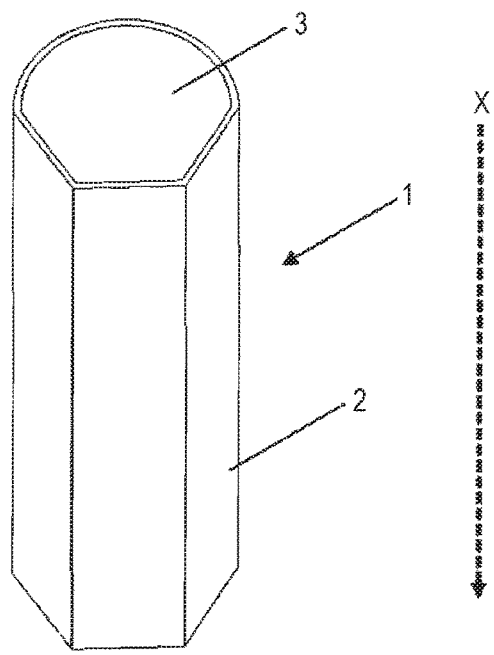
FIG. 5 is a schematic view illustrating an example (circular and polygonal complex type) of an impact absorption portion in a resin-made impact absorption member of the present invention.
Figure 6:
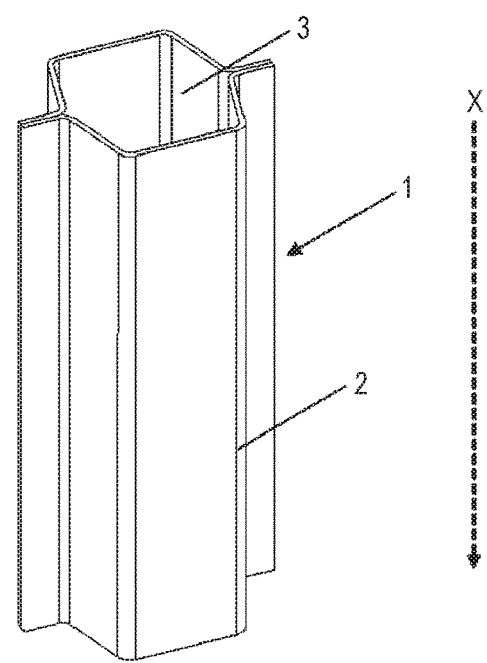
FIG. 6 is a schematic view illustrating an example (flange-attached hexagonal shape) of an impact absorption portion in a resin-made impact absorption member of the present invention.

The impact absorption portion used in the present invention will be described with reference to the drawings. FIG. 1 is a schematic view illustrating a representative example of an impact absorption portion 1 which configures the resin-made impact absorption member of the present invention. As illustrated in FIG. 1, the impact absorption portion 1 used in the present invention is configured of an outer cylindrical portion 2 and a hollow portion 3. In addition, a dotted line arrow X in FIG. 1 illustrates the impact absorption direction of the impact absorption portion 1.

In FIG. 1, as an example of the impact absorption portion in the present invention, an example in which the sectional shape in the direction perpendicular to the impact absorption direction is a perfect circular shape, is illustrated. However, the shape of the impact absorption portion in the present invention is not limited to such a shape, and the above-described sectional shape can be any shape. Therefore, for example, the above-described sectional shape may be a polygonal shape, such as an oval shape (for example, FIG. 2), a rectangular shape (for example, FIG. 3), or a hexagonal shape (for example, FIG. 4), or the sectional shape may be a shape (for example, FIG. 5) made by combining a circular shape and a polygonal shape. In addition, the impact absorption portion in the present invention may be configured by combining hat shapes having flange portions illustrated in FIG. 6. In addition, reference numerals in FIGS. 2 to 6 are similar to those in FIG. 1.

Figure 7:
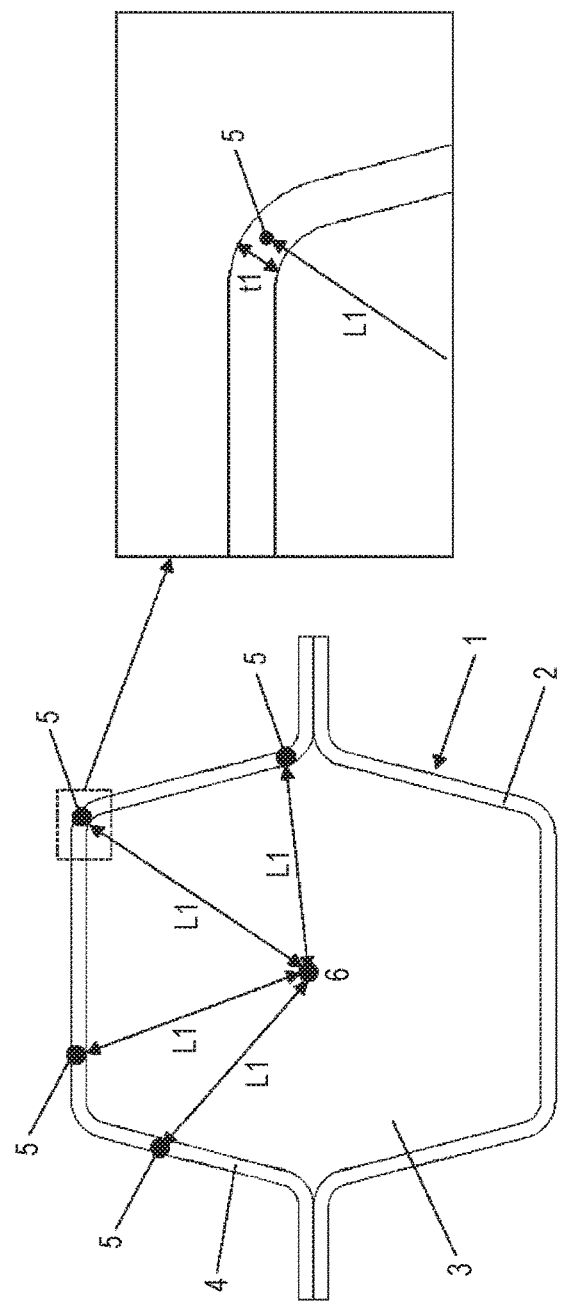
FIG. 7 is a schematic view illustrating a sectional view (description of L1 and t1) in the direction orthogonal to the impact absorption direction of the impact absorption portion illustrated in FIG. 6.

In the impact absorption portion which configures the resin-made impact absorption member of the present invention, the maximum value of the ratio $L1/t1$ of the distance $L1$ from the position of a distance $L1$ from a position of the center of gravity to the outer cylindrical portion on a same section in a sectional shape in a direction orthogonal to an impact absorption direction, to a thickness $t1$ of the outer cylindrical portion, is equal to or less than 40. This will be described with reference to the drawings. FIG. 7 is a view illustrating the "distance $L1$ from the position of the center of gravity to the outer cylindrical portion on the same section" in the sectional shape in the direction orthogonal to the impact absorption direction, and the "thickness $t1$ of the outer cylindrical portion", by using the impact absorption portion illustrated in FIG. 6 as an example. As illustrated in FIG. 7, the "thickness $t1$ of the outer cylindrical portion" is the thickness of the outer cylindrical portion of an arbitrary point 5 in an arbitrary section 4 which is orthogonal to the impact absorption direction. In addition, the "distance $L1$ from the position of the center of gravity to the outer cylindrical portion on the same section" is the distance from a position of the center of gravity 6 on the arbitrary section 4 to the arbitrary point 5. In addition, the arbitrary point 5 is an intermediate point in the thickness direction.

The L1/t1 is a value obtained by dividing the "distance L1 from the position of the center of gravity to the outer cylindrical portion on the same section" by the "thickness t1 of the outer cylindrical portion", and L1 and t1 are the same unit system. The L1/t1 is a value illustrating shape rigidity of the impact absorption portion, and illustrates that the shape rigidity with respect to the compressive load increases as the value decreases. In the impact absorption portion in the present invention, the maximum value of L1/t1 is equal to or less than 40. When the maximum value of L1/t1 exceeds 40, the shape rigidity of the impact absorption portion decreases, and the impact load rapidly decreases since the buckling pitch increases. A more preferable range of the maximum value of L1/t1 is equal to or less than 30, and a still more preferable range is equal to or less than 20. Here, the maximum value of L1/t1 is the largest value among the values of L1/t1 calculated for each point in the outer cylindrical portion on the arbitrary section in the direction orthogonal to the impact absorption direction of the impact absorption portion in the present invention. In a case where the sectional shape changes across the entire region or a part in the impact absorption direction, the maximum values of L1/t1 are calculated by each section, and the maximum value thereof becomes the maximum value of L1/t1.

From the viewpoint of manufacturing the resin-made impact absorption member, the maximum value of L1/t1 of the impact absorption portion is preferably equal to or greater than 10, and is more preferably equal to or greater than 15. This is because, according to this, the entire outer cylindrical portion is bent when the impact is applied, and the buckling can be effectively suppressed.

In addition, each value of the above-described values L1 and t1 is not particularly limited if each of the above-described values L1 and t1 is within a range where the maximum value of L1/t1 is equal to or less than 40, and can be appropriately adjusted in accordance with the use or the like of the resin-made impact absorption member of the present invention.

In the impact absorption portion which configures the resin-made impact absorption member of the present invention, it is preferable that the sectional shape in the direction orthogonal to the impact absorption direction is a polygon, and the maximum value of a ratio L2/t2 between a side length L2 on each side of the polygon and an average thickness t2 of the outer cylindrical portion which configures the side, is equal to or less than 40. As described above, the sectional shape of the impact absorption portion of the present invention is not particularly limited, and may be any of a circular shape or a polygonal shape. However, for example, there are many cases where a vehicular impact absorption member has a polygonal shape from the viewpoint of joining properties with a component in the periphery, or disposition. In addition, in the polygonal impact absorption member which has particularly many angles, the buckling pitch tends to decrease to be lower than that of the circular shape, and from the viewpoint of the impact absorption performance, the sectional shape of the impact absorption portion of the present invention is preferably a polygonal shape, and is more preferably a polygonal shape having many angles. In a case of the polygonal shape, it is preferable that the maximum value of the ratio L2/t2 between the side length L2 on each side and the average thickness t2 of the outer cylindrical portion which configures the side on the polygonal section in the direction orthogonal to the impact absorption direction in the impact absorption portion of the present invention, is equal to or less than 40.

Figure 8:
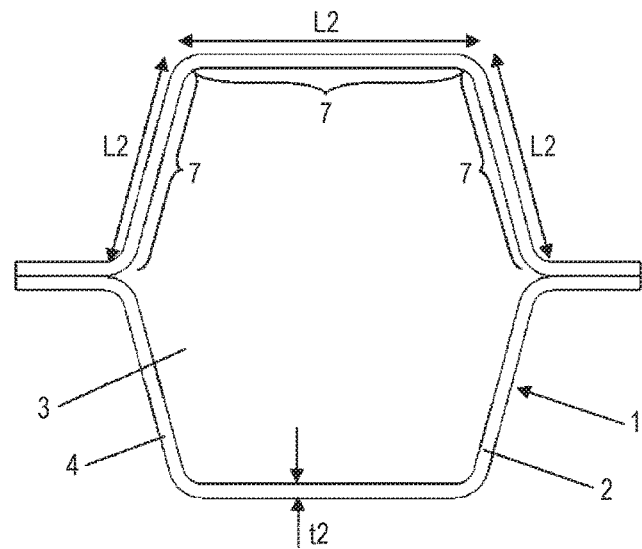
FIG. 8 is a schematic view illustrating a sectional view (description of L2 and t2) in the direction orthogonal to the impact absorption direction of the impact absorption portion illustrated in FIG. 6.

This will be described with reference to the drawings. FIG. 8 is a view illustrating the "side length L2 on each side" and the "average thickness t2 of the outer cylindrical portion which configures the side" in the sectional shape in the direction orthogonal to the impact absorption direction, by using the impact absorption portion illustrated in FIG. 6 as an example. As illustrated in FIG. 8, the "side length L2 on each side" is the length of an arbitrary side 7 of the outer cylindrical portion on the arbitrary section 4 which is orthogonal to the impact absorption direction. In addition, the "average thickness t2 of the outer cylindrical portion which configures the side" is an average thickness of the outer cylindrical portion which configures the arbitrary side 7.

The L2/t2 is a value obtained by dividing the "side length L2 on each side" by the "average thickness t2 of the outer cylindrical portion which configures the side", and L2 and t2 are the same unit system. In addition, the side length L2 in a case where an end point on a side is a curve portion, is the side length when a point which intersects with an adjacent side in a case where it is assumed that the curve portion is not present is the end point. The maximum value of the L2/t2 is the largest value among the values of L2/t2 calculated for each side in the outer cylindrical portion on the arbitrary section. In a case where the sectional shape changes across the impact absorption direction, the maximum values of L2/t2 are calculated on each section, and the maximum value thereof becomes the maximum value of L2/t2. L2/t2 is a value illustrating shape rigidity of the surface which configures the outer cylindrical portion of the polygonal impact absorption portion, and illustrates that the shape rigidity increases as the value decreases. It is preferable that the maximum value of L2/t2 in the present invention is equal to or less than 40. This is because, when the maximum value of L2/t2 exceeds 40, since the shape rigidity of the surface which configures the outer cylindrical portion of the polygonal impact absorption portion decreases, and the buckling pitch increases, there is a case where the impact load rapidly decreases. A more preferable range of the maximum value of L2/t2 is equal to or less than 35, and a still more preferable range is equal to or less than 30.

In addition, the average thickness of t2 is an average of the thickness of the outer cylindrical portion which configures each side, and is an average value of the plurality of thicknesses in a case where each side has a plurality of thicknesses regardless of the length. The average value, for example, can be obtained by averaging measured values of three locations at both ends and at the center of each side.

The maximum value of L2/t2 is preferably equal to or greater than 15, and more preferably equal to or greater than 20. This is because, according to this, the entire outer cylindrical portion is curved when the impact is applied, and the buckling can be effectively suppressed.

In addition, regarding each value of L2 and t2, it is preferable that the maximum value of L2/t2 of the impact absorption portion is within the range which is equal to or less than 40, but can be appropriately adjusted in accordance with the use or the like of the resin-made impact absorption member of the present invention.

In the impact absorption portion which configures the resin-made impact absorption member of the present invention, it is preferable that the sectional shape in the direction orthogonal to the impact absorption direction is a uniform shape across the entire impact absorption direction. In addition, a case where the sectional shape is "similar across the entire impact absorption direction" means that the sectional shape of the impact absorption portion in the direction orthogonal to the impact absorption direction is the same on any section. In order to obtain the stable impact absorption performance, the thickness of the outer cylindrical portion changes across the impact absorption direction similar to Patent Document 6, but in a case where the thickness of the outer cylindrical portion changes, there is a case where a problem, such as a complicated process of disposing the resin material in a mold, is generated. In the impact absorption portion used in the present invention, by the above-described means, it is possible to obtain the stable impact absorption performance even when the sectional shape in the direction orthogonal to the impact absorption direction of the impact absorption portion is a uniform shape across the impact absorption direction.

It is preferable that the impact absorption portion which configures the resin-made impact absorption member of the present invention, is made of a single fiber-reinforced resin material. The "single fiber-reinforced resin material" mentioned here means that, even when the plural types of fiber-reinforced resin materials are used or one type of the fiber-reinforced resin material is used, the fiber orientation is not intentionally changed for every part of the impact absorption portion, and the impact absorption portion is made of one arbitrary type of fiber-reinforced resin material and the fiber orientation is not intentionally changed for every part of the impact absorption portion. In order to obtain the stable impact absorption performance, even when the plural types of fiber-reinforced resin materials are used or one type of fiber-reinforced resin material is used, the fiber orientation is intentionally changed for every part of the impact absorption portion, but there is a case where the manufacturing process becomes complicated or the compressive strength and buckling resistance strength of the boundary part of the material become weak. In the resin-made impact absorption member of the present invention, by the above-described means, even when the impact absorption portion is made of the single fiber-reinforced resin member, it is possible to obtain the stable impact absorption performance.

In the impact absorption portion in the present invention, the sectional shapes of the outer cylindrical portion may be the same or may be different from each other across the entire impact absorption direction. However, when the sectional shapes are the same, it is advantageous that the manufacturing process of the resin-made impact absorption member of the present invention can be simple. In addition, as an aspect in which the sectional shapes are different from each other in the impact absorption direction, for example, an aspect in which the sectional shape continuously changes across the impact absorption direction, or a reinforcing rib or the like is installed in the impact absorption portion, can be employed. In this manner, in a case where the sectional shape changes, it is desirable that a range in which the manufacturing process does not become complicated is achieved.

In addition, the specific size of the impact absorption portion, such as, the height and the width of the impact absorption portion, and the sectional area of the hollow portion, is not particularly limited if the L1/t1 can be within the above-described range, and the size can be appropriately determined in accordance with the use or the like of the resin-made impact absorption member of the present invention.

[Fiber-Reinforcing Resin Material]

Next, the fiber-reinforced resin material used in the present invention will be described. The fiber-reinforced resin material which is used in the present invention contains at least the reinforcing fiber and the thermoplastic resin in order to obtain the desired impact absorption performance. More specifically, in the fiber-reinforced resin material used in the present invention, the reinforcing fiber and the thermoplastic resin are contained, the average fiber length of the reinforcing fiber is 1 mm to 100 mm, the fracture elongation of the thermoplastic resin is equal to or greater than 10%, the compressive elastic modulus of the fiber-reinforced resin material is equal to or greater than 10 GPa, and the compressive strength is 150 MPa to 500 MPa.

(Reinforcing Fiber)

The type of the reinforcing fiber can be appropriately selected in accordance with the type of the thermoplastic resin or the level of the impact absorption performance given to the impact absorption portion, and is not particularly limited. Therefore, as the reinforcing fiber used in the present invention, any of the inorganic fiber or the organic fiber can be appropriately used.

Examples of the inorganic fiber can include: mineral fiber, such as carbon fiber, activated carbon fiber, graphite fiber, glass fiber, tungsten carbide fiber, silicon carbide fiber, ceramics fiber, alumina fiber, natural fiber, or basalt; boron fiber; boron nitride fiber; boron carbide fiber; and metal fiber. Examples of the metal fiber can include aluminum fiber, copper fiber, brass fiber, stainless fiber, and a steel fiber. Examples of the glass fiber can include fibers made of E glass, C glass, S glass, D glass, T glass, quartz glass fiber or borosilicate glass fiber.

Examples of the organic fiber can include fibers made of resin materials, such as polybenzazole, aramid, poly-p-phenylenebenzoxazole (PBO), polyphenylene sulfide, polyester, acryl, polyamide, polyolefin, polyvinyl alcohol, or polyarylate.

The reinforcing fiber used in the present invention may be one type, or may be two or more types. In a case where two or more types of reinforcing fibers are used in the present invention, the plural types of inorganic fibers may be used together, the plural types of organic fibers may be used together, or the inorganic fiber or the organic fiber may be used together. Examples of the aspect in which the plural types of inorganic fibers are used together, can include an aspect in which the carbon fiber and the metal fiber are used together, and an aspect in which the carbon fiber and the glass fiber are used together. Meanwhile, an example of the aspect in which the plural types of organic fibers are used together can include an aspect in which the aramid fiber and the fiber made of another organic material are used together. Furthermore, an example of the aspect in which the inorganic fiber and the organic fiber are used together can include an aspect in which the carbon fiber and the aramid fiber are used together.

In the present invention, it is preferable that the carbon fiber is used as the reinforcing fiber. This is because a fiber-reinforced resin material which is light in weight and has excellent strength can be obtained by the carbon fiber. As the carbon fiber, polyacrylonitrile (PAN) based carbon fiber, petrol and coal pitch based carbon fiber, rayon based carbon fiber, cellulose based carbon fiber, lignin based carbon fiber, phenol based carbon fiber, or vapor-grown carbon fiber, is generally known. However, in the present invention, any of the carbon fibers can be appropriately used.

In the reinforcing fiber used in the present invention, a sizing agent may be adhered to the front surface. In a case where the reinforcing fiber to which the sizing agent is adhered is used, the type of the sizing agent can be appropriately selected in accordance with the type of the reinforcing fiber and the thermoplastic resin, and is not particularly limited.

The average fiber length of the reinforcing fibers used in the present invention is 1 mm to 100 mm. In a case where the average fiber length is less than 1 mm, there is a case where the compressive strength of the fiber-reinforced resin material is less than the desired range, and the displacement of the impact absorption portion during the impact absorption increases. In addition, in a case where the average fiber length exceeds 100 mm, the compressive strength of the fiber-reinforced resin material is extremely greater than the desired range, the initial impact load increases, and the fiber length becomes extremely long. Accordingly, there is a case where the buckling pitch becomes extremely high, and a rapid decrease in the impact load is caused. The average fiber length of the reinforcing fiber is not particularly limited if the average fiber length used in the present invention is within the above-described range, but the range is more preferably 5 mm to 75 mm, and is still more preferably 10 mm to 50 mm. Here, an average fiber length ($La$) of the reinforcing fiber can be obtained based on the following equation, for example, by measuring a fiber length ($Li$) of 100 fibers which are randomly extracted from the fiber-reinforced resin material by a unit of 1 mm using a caliper or the like. The extraction of the reinforcing fiber from the fiber-reinforced resin material can be performed by removing the resin in a furnace, for example, by performing heat treatment for approximately 1 hour at 500° C. with respect to the fiber-reinforced resin material.

$$La = \Sigma Li / 100$$

The measurement of the average fiber length in the present invention may be performed regardless whether the average fiber length is the number average fiber length or the weight average fiber length, but the measurement by the weight average fiber length which is computed considering the longer fiber length important, is preferable. When the fiber length of each carbon fiber is $Li$ and the number of measured fibers is $j$, the number average fiber length ($Ln$) and the weight average fiber length ($Lw$) are acquired by the following equations (1) and (2).

$$Ln = \Sigma Li / j \quad (1)$$

$$Lw = (\Sigma Li^2) / (\Sigma Li) \quad (2)$$

In addition, in a case where the fiber length is constant, such as a case where cutting is performed by a rotary cutter which will be described later, the number average fiber length and the weight average fiber length become the same value.

The average fiber diameter of the reinforcing fiber used in the present invention may be appropriately determined in accordance with the type or the like of the reinforcing fiber, and is not particularly limited. For example, in a case where the carbon fiber is used as the reinforcing fiber, in general, the average fiber diameter is preferably within a range of 3 μm to 50 μm, is more preferably within a range of 4 μm to 12 μm is still more preferably within a range of 5 μm to 8 μm. Meanwhile, in a case where the glass fiber is used as the reinforcing fiber, in general, it is preferable that the average fiber diameter is generally within a range of 3 μm to 30 μm. Here, average fiber diameter indicates the diameter of a single fiber of the reinforcing fibers. Therefore, in a case where the reinforcing fiber is in a shape of a fiber bundle, the average fiber diameter does not indicate the diameter of the fiber bundle, but the diameter of the reinforcing fiber (single fiber) which configures the fiber bundle. The average fiber diameter of the reinforcing fiber can be measured, for example, by a method described in JIS R7607:2000.

The reinforcing fiber used in the present invention may have a shape of a single fiber made of a single fiber regardless of the type, and may have a shape of a fiber bundle made of a plurality of fiber fibers. In addition, the reinforcing fiber used in the present invention may have only a shape of a single fiber, may have only a shape of a fiber bundle, and may be mixed with both. In a case where the reinforcing fiber having a shape of a fiber bundle is used, the number of single fibers which configure each fiber bundle may be substantially constant in each fiber bundle, or may be different. In a case where the reinforcing fiber used in the present invention has a shape of a fiber bundle, the number of single fibers which configure each fiber bundle is not particularly limited, but in general, the number thereof is within a range of 1000 to 100000.

In general, the carbon fiber has a shape of a fiber bundle in which thousands to ten thousands of filaments (single fibers). In a case where the carbon fiber is used as the reinforcing fiber, when the carbon fiber is used as it is, there is a case where an entangled part of the fiber bundle becomes locally thick and a thin-walled fiber-reinforced material is obtained. Therefore, in a case where the carbon fiber is used as the reinforcing fiber, in general, the carbon fiber is used by widening the width of fiber bundle or by opening the fiber.

In a case where the carbon fiber bundle is used being opened, the opening level of the carbon fiber bundle after the opening is not particularly limited, but it is preferable to include a carbon fiber bundle which controls the opening level of the fiber bundle and is made of carbon fibers of which the number is equal to or greater than a certain number, and a carbon fiber (single fiber) or a carbon fiber bundle of which the number of carbon fibers is less than the certain number. In this case, specifically, it is preferable that a carbon fiber bundle (A) which is configured of carbon fibers of which the number is equal to or greater than the critical number of single fibers defined by the following equation (1), and other opened carbon fibers, that is, a fiber bundle which is configured of carbon fibers which are in a state of a single fiber or of which the number is less than the critical number of single fibers, are employed.

$$\text{Critical number of single fibers} = 600/D \quad (1)$$

(Here, $D$ is the average fiber diameter (μm) of the carbon fiber)

Furthermore, in the present invention, a ratio of the carbon fiber bundle (A) with respect to an entire carbon fiber amount in the fiber-reinforced resin material is preferably greater than 0 Vol % and less than 99 Vol %, is more preferably equal to or greater than 20 Vol % and less than 99 Vol %, is still more preferably equal to or greater than 30 Vol % and less than 95 Vol %, and is most preferably equal to or greater than 50 Vol % and less than 90 Vol %. This is because, in this manner, as the carbon fiber bundle made of the carbon fibers of which the number is equal to or greater than the certain number, and other opened carbon fibers or carbon fiber bundles coexist at a certain ratio, it is possible to increase abundance, that is, a fiber volume fraction (Vf) of the carbon fibers in the fiber-reinforced resin material.

The opening level of the carbon fiber can be within a target range by adjusting the opening condition of the fiber bundle. For example, in a case where the air is blown to the fiber bundle and the fiber bundle is opened, it is possible to adjust the opening level by controlling the pressure or the like of the air blown to the fiber bundle. In this case, by increasing the pressure of the air, the opening level increases (the number of single fibers which configure each fiber bundle decreases), and by reducing the pressure of the air, the opening level tends to decrease (the number of single fibers which configure each fiber bundle tends to decrease).

In a case where the carbon fiber is used as the reinforcing fiber in the present invention, the average number of fibers (N) in the carbon fiber bundle (A) can be appropriately determined within a range of not damaging the purpose of the present invention, and is not particularly limited. In a case of the carbon fiber, the N is generally within a range of 1<N<12000, but it is more preferable that the following expression (2) is satisfied.

$$0.6 \times 10^4/D^2 < N < 1 \times 10^5/D^2 \qquad (2)$$

(Here, D is the average fiber diameter (μm) of the carbon fiber)

(Thermoplastic Resin)

Next, the thermoplastic resin used in the present invention will be described. The fracture elongation of the thermoplastic resin used in the present invention is equal to or greater than 10%. The impact absorption portion which configures the impact absorption member of the present invention can obtain the stable impact absorption performance by being crushed by a low buckling pitch. However, in a case where the fracture elongation of the thermoplastic resin in the fiber-reinforced resin material which configures the impact absorption portion is less than 10%, the crushing of the impact absorption portion becomes a brittle fracture mode, the crushing becomes unstable, and the buckling pitch becomes high. Therefore, there is a possibility that the impact load rapidly decreases. The fracture elongation of the thermoplastic resin used in the present invention is more preferably equal to or greater than 30%, and is still more preferably equal to or greater than 50%. The fracture elongation of the thermoplastic resin is the fracture elongation during a tension test, and can be measured, for example, by a method described in JIS K7162:1994.

The thermoplastic resin used in the present invention, is not particularly limited if the fracture elongation is within the above-described range. In the thermoplastic resin used in the present invention, in general, a softening point is within a range of 180° C. to 350° C., but the invention is not limited thereto.

Examples of the thermoplastic resin used in the present invention can include a polyolefin resin, a polystyrene resin, a thermoplastic polyamide resin, a polyester resin, a polyacetal resin (polyoxymethylene resin), a polycarbonate resin, a (meth)acrylic resin, a polyarylate resin, a polyphenylene ether resin, a polyimide resin, a polyether nitrile resin, a phenoxy resin, a polyphenylene sulfide resin, a poly-sulfone resin, a polyketone resin, a polyether keton resin, a thermoplastic urethane resin, a fluorine resin, and a thermoplastic polybenzimidazole resin.

Examples of the polyolefin resin can include a polyethylene resin, a polypropylene resin, a polybutadiene resin, a polymethylpentene resin, a vinyl chloride resin, a vinylidene chloride resin, a polyvinyl acetate resin, and a polyvinyl alcohol resin.

Examples of the polystyrene resin can include a polystyrene resin, an acrylonitrile-styrene resin (AS resin), and an acrylonitrile-butadiene-styrene resin (ABS resin).

Examples of the polyamide resin can include a polyamide 6 resin (nylon 6), a polyamide 11 resin (nylon 11), a polyamide 12 resin (nylon 12), a polyamide 46 resin (nylon 46), a polyamide 66 resin (nylon 66), and a polyamide 610 resin (nylon 610).

Examples of the polyester resin can include a polyethylene terephthalate resin, a polyethylene naphthalate resin, a polybutylene terephthalate resin, a polytrimethylene terephthalate resin, and a liquid crystalline polyester.

An example of the (meth)acrylic resin can include polymethyl methacrylate.

An example of the polyphenylene ether resin can include modified polyphenylene ether.

Examples of the polyamide resin can include thermoplastic polyimide, a polyamide-imide resin, and a polyetherimide resin.

Examples of the poly-sulfone resin can include a modified poly-sulfone resin and a polyether-sulfone resin.

Examples of the polyether ketone resin can include a polyether ketone resin, a polyether ether ketone resin, and a polyether ketone resin.

An example of the fluorine resin can include polytetrafluoroethylene.

The thermoplastic resin used in the present invention may be only one type, and may be two or more types. As an aspect in which two or more types of thermoplastic resins are used together, for example, an aspect in which the thermoplastic resins in which softening points or melting points are different from each other are used together, or an aspect in which the thermoplastic resins in which average molecular weights are different from each other are used together, can be employed, but the invention is not limited thereto.

(Fiber-Reinforced Resin Material)

The compressive elastic modulus of the fiber-reinforced resin material used in the present invention is equal to or greater than 10 GPa. In a case where the compressive elastic modulus of the fiber-reinforced resin material is less than 10 GPa, since the shape rigidity of the outer cylindrical portion which configures the impact absorption portion is not sufficient, and the buckling pitch increases, there is a possibility that the impact load rapidly decreases. A more preferable range of the compressive elastic modulus is equal to or greater than 15 GPa, and a still more preferable range is equal to or greater than 20 GPa. Making the compressive elastic modulus of the fiber-reinforced resin material used in the present invention be within the above-described range, is achieved, for example, by a method of adjusting the fraction of the reinforcing fiber in the fiber-reinforced resin material, adjusting the fiber length, or changing at least one type of the reinforcing fiber and the thermoplastic resin. More specifically, by using at least one type of the reinforcing fiber and thermoplastic resin in which the fraction of the reinforcing fiber increases, the fiber length increases, or the compressive elastic modulus is high, it is possible to increase the compressive elastic modulus. In addition, it is possible to decrease the compressive elastic modulus by reverse adjustment.

In addition, the compressive strength of the fiber-reinforced resin material used in the present invention is 150 MPa to 500 MPa. In a case where the compressive strength of the fiber-reinforced resin material is less than 150 MPa, there is a case where the displacement required for absorbing the desired impact energy increases. Meanwhile, in a case where the compressive strength exceeds 500 MPa, there is a case where the initial impact load becomes extremely high. A more preferable range of the compressive strength is 200 MPa to 450 MPa, and a still more preferable range is 250 MPa to 400 MPa. Making the compressive strength of the fiber-reinforced resin material used in the present invention is achieved, for example, by adjusting the fraction of the reinforcing fiber in the fiber-reinforced resin material, by adjusting the fiber length, or by changing at least one type of the reinforcing fiber and the thermoplastic resin. More specifically, by using at least one type of the reinforcing fiber and thermoplastic resin in which the fraction of the reinforcing fiber increases, the fiber length increases, or the compressive elastic modulus is high, it is possible to increase the compressive strength. In addition, it is possible to decrease the compressive strength by reverse adjustment.

In addition, the compressive elastic modulus and the compressive strength of the fiber-reinforced resin material can be measured, for example, by a method described in JIS K7076:1991.

As described above, the fiber-reinforced resin material used in the present invention includes at least the reinforcing fiber and the thermoplastic resin, but within a range of not damaging the purpose of the present invention, and any type of additives may be included as necessary. Each type of additive is not particularly limited if the desired function or characteristics can be given to the fiber-reinforced resin material in accordance with the use or the like of the fiber-reinforced resin material. Examples of each type of additive used in the present invention can include melt viscosity reducing agent, antistatic agent, pigment, softening agent, plasticizer, surfactant, conductive particles, filler, carbon black, coupling agent, foaming agent, lubricant, corrosion inhibitor, nucleating agent, crystallization accelerator, releasing agent, stabilizer, ultraviolet absorber, coloring agent, discoloration preventing agent, antioxidant, flame retardant, auxiliary flame retardant, dripping preventing agent, lubricant, fluorescent brightening agent, luminous pigment, fluorescent dye, fluidity modifier, inorganic and organic antibacterial agents, insecticide, photocatalyst-based antifouling agent, infrared absorber, and photochromic agent.

In addition, the fiber-reinforced resin material used in the present invention may include a short fiber having a short fiber length as each type of the additive. As the short fiber used here, except that the average fiber length (weight average fiber length, number average fiber length) is shorter than the above-described reinforcing fiber, a fiber similar to the above-described reinforcing fiber can be used. The fiber length of the short fiber is shorter than the above-described reinforcing fiber, and for example, the average fiber length (weight average fiber length, number average fiber length) can be equal to or less than 1 mm, for example.

The abundance of the thermoplastic resin in the fiber-reinforced resin material used in the present invention can be appropriately determined in accordance with the type of the thermoplastic resin or the type of the reinforcing fiber, and is not particularly limited. However, in general, the abundance is within a range of 3 parts by weight to 1000 parts by weight with respect to 100 parts by weight of the reinforcing fiber.

It is preferable that the volume fraction of the reinforcing fiber in the fiber-reinforced resin material used in the present invention is 10 Vol % to 70 Vol %. In a case where the volume fraction of the reinforcing fiber in the fiber-reinforced resin material is less than 10 Vol %, there is a case where the desired compressive elastic modulus or compressive strength is not obtained. Meanwhile, in a case where the volume fraction exceeds 70 Vol %, there is a case where the compressive strength becomes extremely high, the fluidity of the fiber-reinforced resin material deteriorates, and the desired shape is not obtained during the molding. A more preferable range of the volume fraction of the reinforcing fiber in the fiber-reinforced resin material is 20 Vol % to 60 Vol %, and a still more preferable range is 30 Vol % to 50 Vol %.

In addition, the existence state of the reinforcing fiber in the fiber-reinforced resin material is not particularly limited, and for example, the state may be a state of being arranged in one direction, or may be a state of being randomly arranged. Among these, in the present invention, from the viewpoint of the uniformity of the shape rigidity or the strength in the resin-made impact absorption member, a state where the long axial direction of the reinforcing fiber is randomly arranged in the in-surface direction of the fiber-reinforced resin material, and is two-dimensionally randomly arranged, is preferable. Here, the two-dimensional random arrangement of the carbon fiber in the fiber-reinforced resin material can be confirmed, for example, by performing the tension test by using the arbitrary direction of the fiber-reinforced resin material and the direction orthogonal thereto as a reference, and by measuring a ratio (Eδ) obtained by dividing a large value by a small value of the measured tensile modulus after measuring the tensile modulus. In a case where the ratio of the elasticity is less than 2, it is possible to evaluate that the carbon fibers are two-dimensionally randomly arranged, and in a case where the ratio of the elasticity is less than 1.3, it is possible to evaluate that the carbon fibers are excellently two-dimensionally randomly arranged.

(Manufacturing Method of Fiber-Reinforced Resin Material)

Next, a manufacturing method of the fiber-reinforced resin material used in the present invention will be described. The fiber-reinforced resin material used in the present invention can be manufactured by using a generally known method. For example, the fiber-reinforced resin material can be manufactured by 1. a process of cutting the reinforcing fiber, 2. a process of opening the cut reinforcing fiber, and 3. a process of obtaining a prepreg by heat-compressing after mixing the opened reinforcing fiber and the fiber-shaped or particle-shaped thermoplastic resin, but the invention is not limited thereto. In addition, in this method, the prepreg is the fiber-reinforced resin material.

[Configuration Element Other than Impact Absorption Portion]

As describe above, the resin-made impact absorption member of the present invention includes at least the impact absorption portion, but within the range of not damaging the purpose of the present invention, a configuration element other than the impact absorption portion may be employed. As another configuration element used in the present invention, in accordance with the use or the like of the resin-made impact absorption member of the present invention, a configuration element can be appropriately selected within the range of not damaging the purpose of the present invention, and although not particularly limited, for example, a flange portion for connecting to a component in the periphery, or a component for reinforcing the resin-made impact absorption member can be employed.

In addition, another configuration element used in the present invention may be made of a resin material, or may be made of a metal material, such as iron or aluminum. In a case where the above-described another configuration element is made of a resin material, the configuration element may be press-molded to be integrated with the impact absorption portion, or may be joined to the impact absorption portion by welding, adhering, riveting or the like as a component separated from the impact absorption portion. Meanwhile, in a case where another configuration element is made of a metal material, in general, the configuration element may be joined to the impact absorption portion by insert molding, adhering, or screwing.

In the resin-made impact absorption member of the present invention, an aspect in which the impact absorption portion includes the fiber-reinforced resin material, and is constituted by the impact absorption base material having a substantially constant thickness, and further, in the impact absorption base material, a plurality of thermoplastic resin base materials having different compressive strengths are combined in the impact absorption direction, is preferable. Accordingly, an effect that the light weight and the impact absorption performance can be freely designed, is achieved.

Hereinafter, the above-described aspect will be described.

Figure 19A:
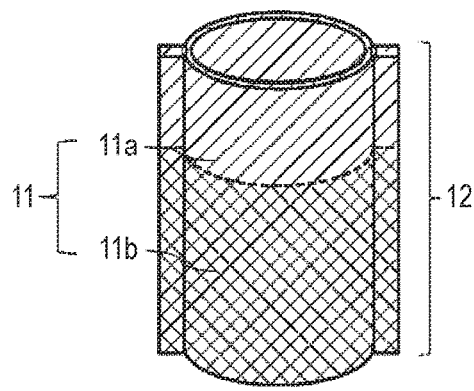
FIGS. 19A to 19B are schematic views illustrating an example of a case where an impact absorption portion is cylindrical in the present invention.
Figure 19B:
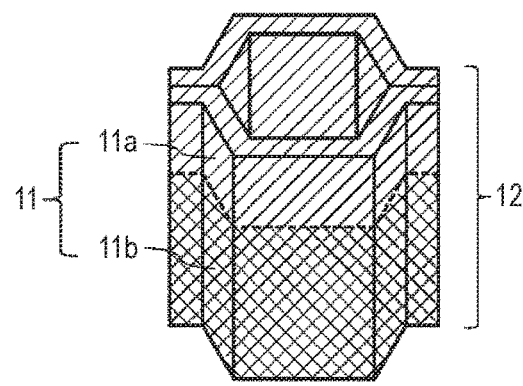

FIGS. 19A and 19B are schematic views illustrating an example of the impact absorption portion in the aspect. As illustrated in FIGS. 19A and 19B, an impact absorption portion 12 in the aspect is constituted by an impact absorption base material 11 which includes the fiber-reinforced resin material and has a substantially constant thickness, and further, in the impact absorption base material 11, a plurality of thermoplastic resin base materials 11a and 11b having different compressive strengths are combined in the impact absorption direction. In this case, as illustrated in FIGS. 19A and 19B, a wall portion of the cylindrical impact absorption portion 12 is made of the thermoplastic resin base materials 11a and 11b.

In addition, the sectional shape in the direction orthogonal to the impact absorption direction of the impact absorption portion used in the aspect is not particularly limited, and for example, and may be any shape among a circular shape, an oval shape, a triangle shape, or a rectangular shape. As an example in which the sectional shape is circular, for example, an aspect illustrated in FIG. 19A can be employed. In addition, as an example in which the sectional shape is polygonal, for example, an aspect illustrated in FIG. 19B can be employed.

Figure 20A:
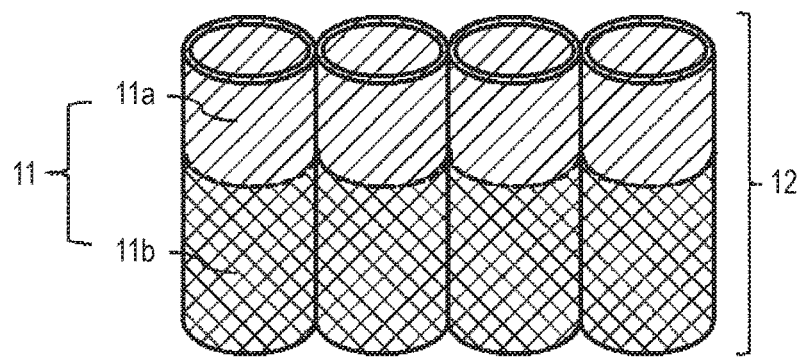
FIGS. 20A to 20B are schematic views illustrating another example of a resin-made impact absorption member of the present invention.
Figure 20B:
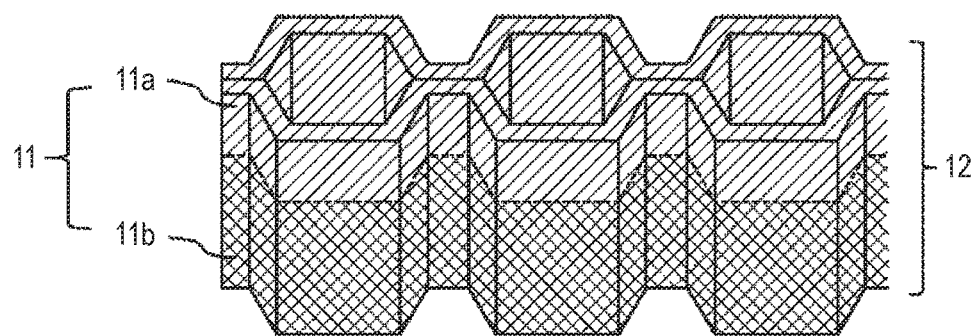

Furthermore, the impact absorption portion used in the aspect may be made of a single cylindrical body, and may be made by linking the plurality of cylindrical bodies. A case where the impact absorption portion is made by linking the plurality of cylindrical bodies in the aspect, will be described with reference to the drawings. FIGS. 20A and 20B are schematic views illustrating an example of a case where the plurality of cylindrical bodies are linked. As illustrated in FIGS. 20A and 20B, the impact absorption portion used in the aspect may be made by linking the plurality of circular cylindrical bodies, or may be made by linking the plurality of polygonal cylindrical bodies.

In addition, as the impact absorption portion used in the aspect is made by linking the plurality of cylindrical bodies, an impact absorption portion made by linking the cylindrical bodies which are formed separately later (for example, FIG. 20A), or an impact absorption portion made by linking the plurality of cylindrical bodies, for example, by combining the plurality of components having recessed portions (for example, FIG. 20B), may be employed.

[Impact Absorption Base Material]

The impact absorption base material is configured by combining the plurality of thermoplastic resin base materials having a substantially constant thickness and different compressive strengths in the impact absorption direction.

The expression "the thickness of the impact absorption base material is substantially constant" means that the average thickness of the plurality of thermoplastic resin base materials which configure the impact absorption base material is substantially constant. In this manner, as the average thickness of each thermoplastic resin base material is substantially constant, in the resin-made impact absorption member of the aspect, when the impact is applied to the impact absorption portion from the outside, regardless of the size of the impact or the direction of the impact, it is possible to prevent the boundary part of the thermoplastic resin base material from becoming a starting point of fracture, and further, the attachment to the component in the periphery becomes easy.

In addition, the expression "the thickness of the impact absorption base material is substantially constant" means that the thicknesses of each thermoplastic resin base material are not completely the same, and regardless of the size of the impact or the direction of the impact, when the impact is applied to the resin-made impact absorption member from the outside, because of the difference in the thicknesses of each thermoplastic resin base material, the average thickness of each thermoplastic resin base material becomes close to the thickness at which the boundary between the thermoplastic resin base materials does not become the starting point of the fracture.

More specifically, the difference in the average thicknesses of each thermoplastic resin base material is preferably equal to or less than ±10%, and is more preferably equal to or less than ±5%. This is because, as the difference in the average thicknesses of each thermoplastic resin base material is within such a range, regardless of the size of the impact or the direction of the impact, when the impact is applied to the resin-made impact absorption member of the aspect from the outside, because of the difference in the average thicknesses of each thermoplastic resin base material, it is possible to prevent the boundary between the thermoplastic resin base materials from becoming the starting point of the fracture. Here, the average thicknesses of each thermoplastic resin base material can be acquired, for example, by measuring the thicknesses of three points, such as a front half part, an intermediate part, and a rear half part, toward the rear end side from the tip end side which receives the impact in each thermoplastic resin base material using a caliper or a micrometer, and by acquiring the average value thereof.

The average thicknesses of each thermoplastic resin base material can be appropriately determined within a range in which the desired impact absorption performance can be realized in accordance with the use or the like of the resin-made impact absorption member, and is not particularly limited. However, in general, the average thickness is preferably within a range of 1 mm to 10 mm, and is more preferably with a range of 2 mm to 8 mm.

While the impact absorption base material is configured by combining the plurality of thermoplastic resin base materials having different compressive strengths, the compressive strengths of each thermoplastic resin base material is not particularly limited if the compressive strengths are within the range in which the desired impact absorption performance can be given to the impact absorption portion, and appropriate adjustment of the design is possible. Here, the compressive strength of the thermoplastic resin base material can be measured, for example, by the method described in JIS K7076:1991.

Figures 15A, 15B, 15C, 15D, 15E:
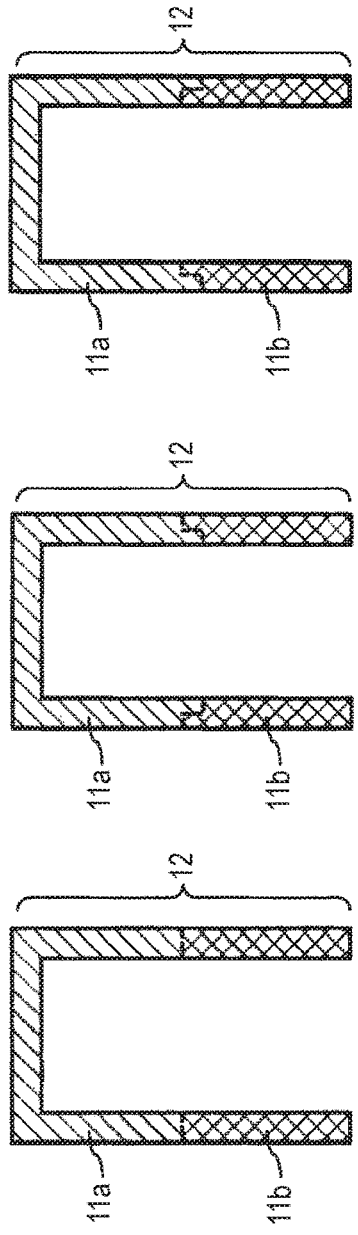
FIGS. 15A to 15E are schematic views illustrating an example of a combined aspect of a thermoplastic resin base material in the present invention.

An aspect in which the plurality of thermoplastic resin base materials having different compressive strengths are combined in the impact absorption base material, is not particularly limited if the adjacent thermoplastic resin base materials can be combined at the strength which is equal to or greater than the desired strength. As the combined aspect used in the aspect, for example, an aspect in which the end surfaces of adjacent thermoplastic resin base materials are combined with each other (combined aspect i), an aspect in which parts of the end portions of the adjacent thermoplastic resin base materials are combined to be overlapped (combined aspect ii), and further, an aspect in which adjacent thermoplastic resin base materials are combined so that the abundance in the thickness direction in the boundary thereof continuously changes (combined aspect iii), can be employed. The aspects will be described with reference to the drawings. FIGS. 15A to 15E are schematic views illustrating an example of each of the above-described combined aspects. As illustrated in FIGS. 15A to 15E, as an aspect in which the thermoplastic resin base materials are combined in the aspect, an aspect in which end surfaces of the thermoplastic resin base materials 11a and 11b are combined with each other as illustrated in FIG. 15A (combined aspect i), an aspect in which parts of the end portions of the thermoplastic resin base materials 11a and 11b are combined to be overlapped as illustrated in FIGS. 15B and 15C (combined aspect ii), or an aspect in which the thermoplastic resin base materials 11a and 11b are combined so that the abundance in the thickness direction in the boundary thereof continuously changes as illustrated in FIGS. 15D and 15E (combined aspect iii), may be employed.

In the aspect, it is possible to appropriately use any of the above-described combined aspects, but among these, it is preferable to use the combined aspect iii. By combining adjacent thermoplastic resin base materials by the combined aspect iii, regardless of the size of the impact or the direction of the impact, when the impact is applied to the resin-made impact absorption member of the aspect from the impact absorption direction, it is possible to further prevent the boundary part of the thermoplastic resin base material from becoming the starting point of fracture.

In addition, as a method of realizing each of the above-described combined aspects, the combined aspect i can employ, for example, a method of preparing two types of thermoplastic resin base materials having different compressive strengths, inputting two types of thermoplastic resin base materials to a predetermined position in the predesigned mold so that the end portion is in contact with the position, and performing the press-molding. The combined aspect ii can employ, for example, a method of preparing two types of thermoplastic resin base materials having different compressive strengths, inputting two types of thermoplastic resin base materials to a predetermined position in the predesigned mold so that the step of the end surface overlaps the position after forming the step on the end surface of each thermoplastic resin base material, and performing the press-molding. In addition, the combined aspect iii can employ, for example, a method of preparing two types of thermoplastic resin base materials having different compressive strengths, inputting two types of thermoplastic resin base materials to a predetermined position in the predesigned mold so that the end portion overlaps the position, and combining two types of thermoplastic resin base materials by allowing the overlapped part flow during the press molding. In addition, in a case of any aspect, after separately molding the thermoplastic resin base materials having different compressive strengths in advance, it is possible to combine the surfaces by a heat welding method, such as oscillation welding or ultrasonic wave welding, or by a mechanical fastening method using an adhesive, a bolt, or a nut.

The impact absorption base material is configured by combining the plurality of thermoplastic resin base materials having different compressive strengths in the impact absorption direction, but an aspect in which the plurality of thermoplastic resin base materials are disposed in the impact absorption direction, is not particularly limited if the desired impact absorption performance can be given to the impact absorption portion. Among these, an aspect in which the thermoplastic resin base materials are disposed in order of increasing the compressive strength along the impact absorption direction, is preferable. This is because, in the aspect, since it is possible to improve the impact strength of the impact absorption portion when the fracture of the impact absorption portion advances as the plurality of thermoplastic resin base materials having different compressive strengths are disposed, it is possible to effectively prevent the impact absorption portion from being completely collapsed by the external impact. Here, "the order of increasing the compressive strength along the impact absorption direction" is an order of increasing the compressive strength toward the rear end side from the tip end side which receives the impact.

Figure 16:
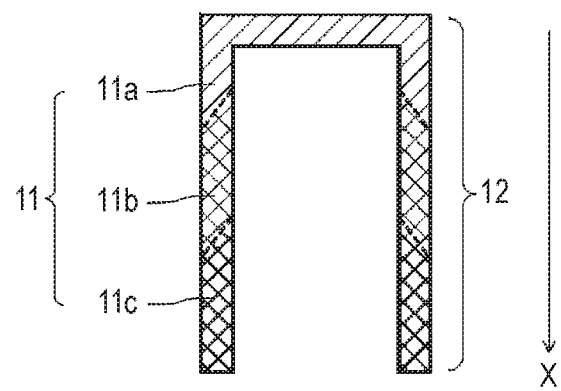
FIG. 16 is a schematic view illustrating an example of an aspect in which the thermoplastic resin base material is disposed in an impact absorption base material in the present invention.

The disposition aspect of the thermoplastic resin base material is described with reference to the drawings. FIG. 16 is a schematic view illustrating an example of a case where the plurality of thermoplastic resin base materials having different compressive strengths are disposed in order of increasing the compressive strength toward the rear end side from the tip end side which receives the impact, in the impact absorption base material. As illustrated in FIG. 16, in the impact absorption base material 11, it is preferable that each of the thermoplastic resin base materials 11a, 11b, and 11c are disposed in order of increasing the compressive strength toward the rear end side from the tip end side which receives the impact. In addition, the compressive strengths of the thermoplastic resin base materials 11a, 11b, and 11c in FIG. 16 increase in this order.

In addition, in the aspect, as the volume fractions of the reinforcing fibers of the plurality of thermoplastic resin base materials are different from each other, it is preferable that the compressive strength becomes different.

In addition, the types of the thermoplastic resin base materials which configure the impact absorption base material is not particularly limited if the type is equal to or greater than 2, and in accordance with the impact absorption performance given to the impact absorption portion, an appropriate type can be selected.

In the impact absorption base material, the boundary direction between the thermoplastic resin base materials may be any direction other than the direction parallel to the impact absorption direction, but it is preferable that the boundary direction is the direction substantially perpendicular to the impact absorption direction. This is because, according to this, the fracture during the impact absorption is transmitted to the entire region equivalently, stable fracture continuously stays at the entire part, and large impact can be absorbed. In addition, this is because the absorption efficiency per member weight of the resin-made impact absorption member is improved.

Figure 17:
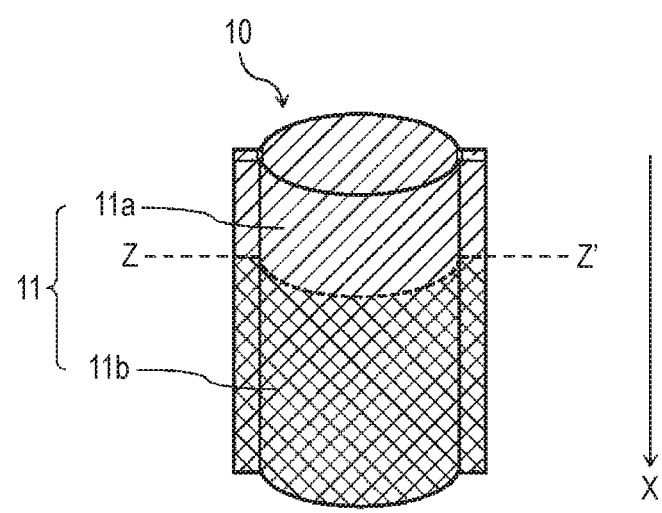
FIG. 17 is a schematic view illustrating another example of a combined aspect of a thermoplastic resin base material in the present invention.

Here, the expression that the boundary direction between the thermoplastic resin base materials is the direction substantially perpendicular to the impact absorption direction of the impact absorption portion, means that the direction Z-Z' of the boundary of the thermoplastic resin base materials 11a and 11b in the impact absorption base material 11 is substantially perpendicular to the impact absorption direction X, as illustrated in FIG. 17.

[Thermoplastic Resin Base Material]

Next, the thermoplastic resin base material which configures the impact absorption base material will be described. The thermoplastic resin base material used in the aspect is made of the fiber-reinforced resin material containing the above-described reinforcing fiber and the thermoplastic resin. As the reinforcing fiber and the thermoplastic resin, the reinforcing fiber and the thermoplastic resin similar to those described above can be used.

[Aspect of Thermoplastic Resin Base Material]

The thermoplastic resin base material used in the aspect may be made of a single layer, or may be a stacked body configured by stacking a plurality of layers. As an aspect in which the thermoplastic resin base material is a stacked body, for example, an aspect in which a discontinuous fiber layer and a continuous fiber layer are stacked, can be employed. As a specific example of the aspect, a sandwich stacked body in which the discontinuous fiber layer is stacked on a core layer and the continuous fiber layer is stacked on a skin layer, a sandwich stacked body in which the discontinuous fiber layer is stacked on a skin layer and the continuous fiber layer is stacked on a core layer, or a stacked body in which the continuous fiber layers are stacked while swinging the angle in accordance with the purpose, can be employed. In addition, as another aspect in which the thermoplastic resin base material is a stacked body, a stacked body in which the discontinuous fiber layers having different compressive strengths are stacked, can be employed. Among these, in the aspect, in a case where the thermoplastic resin base material of the discontinuous fiber layer and the continuous fiber layer is the stacked body, the sandwich stacked body in which the discontinuous fiber layer is stacked on the skin layer and the continuous fiber layer is stacked on the core layer, and the stack ratio is symmetric in the thickness direction, is preferable. This is because, according to this, it is possible to prevent the thermoplastic resin base material from being bent. In addition, this is because, when the continuous fiber layer is used on the skin layer, the continuous fiber is damaged during the impact absorption, and there is a possibility that the performance according to the design is not obtained, but the concern become less compared to a case where the continuous fiber layer is used on the core layer. Here, the "continuous fiber layer" indicates the thermoplastic resin base material containing the continuous fiber as the reinforcing fiber, and the "discontinuous fiber layer" indicates the thermoplastic resin base material containing the discontinuous fiber as the reinforcing fiber.

[Aspect in which Plurality of Thermoplastic Resin Base Materials are Used]

As the impact absorption base material in the aspect, the impact absorption base material configured by combining the plurality of thermoplastic resin base materials having different compressive strengths, is used. However, the difference in compressive strengths of the adjacent thermoplastic resin base materials is not particularly limited if the difference is within the range in which the desired impact absorption performance can be given to the resin-made impact absorption member of the aspect. Among these, in the aspect, the difference in compressive strengths of the adjacent thermoplastic resin base materials is more preferably within a range of 50 MPa to 350 MPa, and is still more preferably within a range of 100 MPa to 250 MPa. This is because, as the difference in compressive strengths of the adjacent thermoplastic resin base materials is within the above-described range, regardless of the size of the impact or the direction of the impact, when the impact is applied to the resin-made impact absorption member of the aspect, it is possible to prevent the impact absorption performance from being damaged as the boundary of the adjacent thermoplastic resin base materials becomes the starting point or the like of the fracture.

As an aspect in which the compressive strengths are different between each of the thermoplastic resin base materials, the aspect is not particularly limited if the aspect is an aspect other than the aspect in which the thicknesses are different. In the aspect, in a case where the thermoplastic resin base material is made of the thermoplastic resin, for example, an aspect in which the type of the thermoplastic resin is different, or an aspect in which the average molecular weight of the thermoplastic resin is different, can be employed. In addition, in a case where the thermoplastic resin base material is made of the above-described fiber-reinforced thermoplastic resin composite material, for example, an aspect in which the type of reinforcing fiber is different, an aspect in which the average fiber length of the reinforcing fiber is different, an aspect in which the orientation state of the reinforcing fiber is different, and an aspect in which the volume fraction (Vf) of the reinforcing fiber is different, can be employed.

In addition, regardless of the material which configures the thermoplastic resin base material, an aspect in which a layer structure of the thermoplastic resin base material is different, can be employed. As the aspect, for example, an aspect in which the thermoplastic resin base material made of a single layer and the thermoplastic resin base material having the layer structure are used to be combined, and an aspect in which the thermoplastic resin base material having the layer structures of which the configurations are different from each other, can be employed.

Furthermore, in the aspect, an aspect in which each of the above-described aspects is combined can be used. As the aspect, for example, an aspect in which the average fiber length of the reinforcing fiber and the volume fraction (Vf) of the reinforcing fiber are different, or an aspect in which the type and the layer structure of the reinforcing fiber are different, can be employed, but the invention is not limited thereto.

In a case where the thermoplastic resin base material is made of the above-described fiber-reinforced thermoplastic resin composite material, as an aspect in which the orientation state of the reinforcing fiber is different, for example, an aspect in which the thermoplastic resin base material in which the reinforcing fibers are randomly oriented and the thermoplastic resin base material in which the reinforcing fibers are oriented in one direction are combined, or an aspect in which the thermoplastic resin base materials in which the levels of isotropy (anisotropy) of the orientation are different from each other are combined, can be employed. Here, as the latter aspect, for example, an aspect in which thermoplastic resin base materials in which the tensile modulus (Eδ) of the thermoplastic resin base material is different are combined, can be employed. In addition, the tensile modulus (Eδ) means a ratio (Eδ) obtained by dividing a large value by a small value of the measured tensile modulus after performing the tension test by using the arbitrary direction of the thermoplastic resin base material and the direction orthogonal thereto as a reference, and measuring the tensile modulus (Eδ).

In addition, an aspect in which the volume fraction (Vf) of the reinforcing fiber is different, is not particularly limited if the volume fraction is within the range in which the difference in the desired level is provided in the compressive strength of the adjacent thermoplastic resin base material. However, among these, in the aspect, in the adjacent thermoplastic resin base materials, the difference in the Vf is preferably equal to or greater than 10%, is more preferably within a range of 5% to 60%, and is still more preferably within a range of 10% to 40%.

Furthermore, an aspect in which the average fiber length of the reinforcing fibers is different, is not particularly limited if the average fiber length is within the range in which the difference in the desired level is provided in the compressive strength of the adjacent thermoplastic resin base materials. However, among these, in the aspect, in the adjacent thermoplastic resin base materials, the difference in the average fiber length of the reinforcing fiber is preferably within a range of 5 mm to 90 mm, and is more preferably within a range of 10 mm to 50 mm.

2 Resin-Made Impact Absorption Member

The resin-made impact absorption member of the aspect is provided with at least the impact absorption portion, but may have another configuration element as necessary. As another configuration element used in the aspect, for example, a bottom portion formed to be connected to the rear end portion with respect to the impact absorption direction of the impact absorption portion, a lid portion formed to be connected to the tip end portion, and a plate-like insertion member for ensuring the shape rigidity of the resin-made impact absorption member, can be employed.

Figure 21:
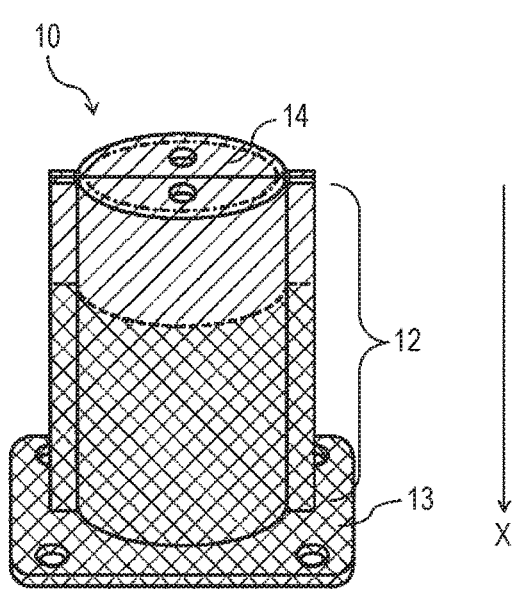
FIG. 21 is a schematic view illustrating another example of a resin-made impact absorption member of the present invention.

FIG. 21 is a schematic view illustrating an example of a case where the bottom portion and the lid portion are used as another configuration element. As illustrated in FIG. 21, an impact absorption portion 10 of the aspect may include a bottom portion 13 formed to be connected to the rear end portion with respect to the impact absorption direction of the impact absorption portion 12, and may further include a lid portion 14 formed to be connected to the tip end portion.

An aspect in which, in the resin-made impact absorption member of the present invention, the impact absorption portion includes the flange portions, the plurality of resin shaped products made of the fiber-reinforced resin material are combined to form the boundary portion as the flange portions come into contact with each other, and the impact absorption portion includes an impact absorption auxiliary portion made of the resin material formed to cover the boundary portion, is preferable. Accordingly, the resin-made impact absorption member can achieve an effect that the adjustment of the impact absorption performance is easy in accordance with the use by a simple structure.

Hereinafter, the above-described aspect will be described.

Figure 23A:
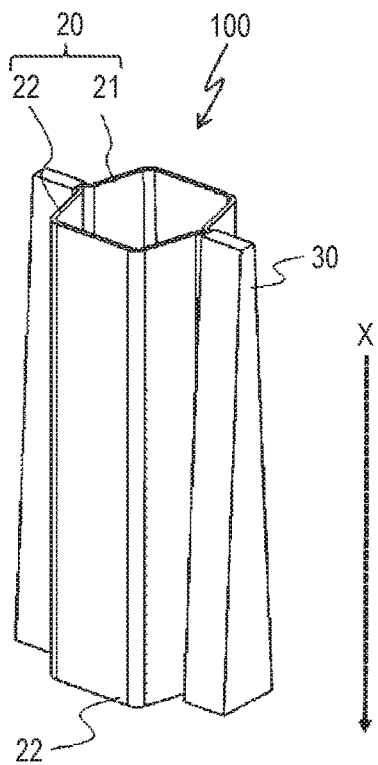
FIGS. 23A to 23B are schematic views illustrating an example of an impact absorption portion in a resin-made impact absorption member of the present invention.
Figure 23B:
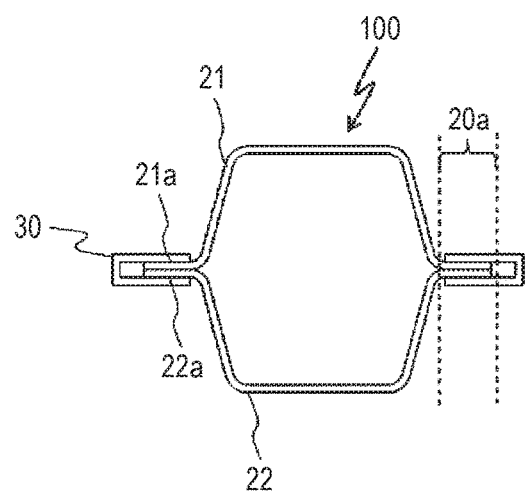

The impact absorption portion of the aspect will be described with reference to the drawings. FIGS. 23A to 23B are schematic views illustrating a representative example of the impact absorption portion which configures the resin-made impact absorption member. FIG. 23B is a sectional view in the direction perpendicular to the impact absorption direction X of the impact absorption portion illustrated in FIG. 23A. As illustrated in FIGS. 23A and 23B, the impact absorption portion 100 used in the aspect includes: an impact absorption portion 20 in which resin shaped products 21 and 22 having flange portions 21a and 22a are combined and the hollow structure is provided; and an impact absorption auxiliary portion 30. Here, the resin shaped products 21 and 22 are combined to form a boundary portion 20a as the flange portions 21a and 22a are in contact with each other. In addition, the impact absorption auxiliary portion 30 is formed to cover the boundary portion 20a. Furthermore, each of the resin shaped products 21 and 22 is made of the fiber-reinforced resin material containing the reinforcing fiber and the thermoplastic resin, and the impact absorption auxiliary portion is made of the resin material. In addition, the dotted line arrow X in FIGS. 23A to 23B illustrates the impact absorption direction of the impact absorption portion 100.

[Impact Absorption Portion (Hollow Impact Absorption Body)]

In the impact absorption portion in the aspect, the plurality of resin shaped products including the flange portions made of the fiber-reinforced resin material are combined to form the boundary portion as the flange portions come into contact with each other, and accordingly, the hollow structure is made. In addition, in the aspect, in order to clearly distinguish the impact absorption portion and the impact absorption auxiliary portion which will be described later, there is a case where the impact absorption portion in the aspect is referred to as a "hollow impact absorption portion".

Since the hollow impact absorption body in the aspect is configured of the resin shaped product, the shape of the hollow impact absorption body in the aspect depends on the shape of the resin shaped product. The shape of the resin shaped product is not particularly limited if the shape has the flange portions and the shape can form the hollow structure by combining the plurality of resin shaped products so that the flange portions come into contact with each other. Furthermore, since it is necessary to make it possible to form the hollow structure by combining the resin shaped products so that the flange portions come into contact with each other, in general, the resin shaped product in the aspect has a shape in which the flange portions are formed at the positions which correspond to both end portions in the direction parallel to the impact absorption direction after forming the hollow impact absorption body.

In addition, the "flange portion" in the aspect is a flat portion provided in the end portion of the resin shaped products, and is a part which has an area in which the engagement is possible by the impact absorption auxiliary portion in a case where the plurality of resin shaped products are combined and the hollow structure is made.

Figure 24:
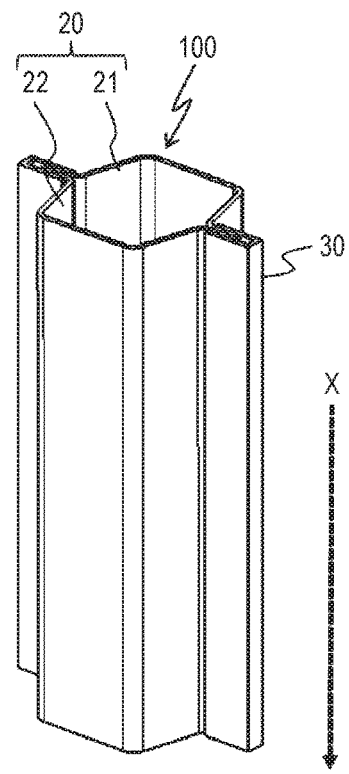
FIG. 24 is a schematic view illustrating another example of an impact absorption portion in a resin-made impact absorption member of the present invention.
Figure 25:
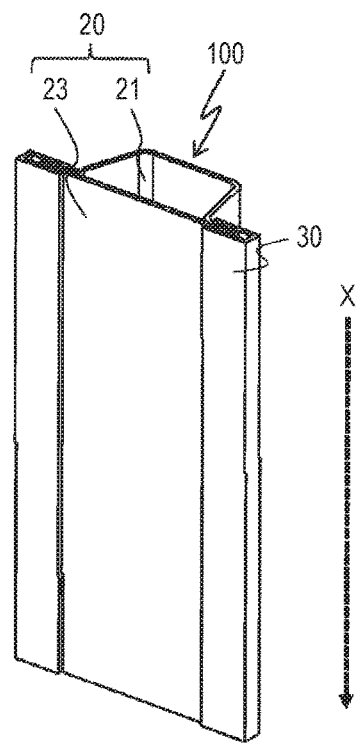
FIG. 25 is a schematic view illustrating another example of an impact absorption portion in a resin-made impact absorption member of the present invention.

The shape of the resin shaped product used in the aspect is not particularly limited if the shape has the flange portions and can form the hollow structure. As the shape, a hat shape, such as the resin shaped products 21 and 22 illustrated in FIG. 24, and a shape of a flat plate, such as a resin shaped product 23 illustrated in FIG. 25, can be employed. The resin shaped product used in the aspect may have any of the shapes. In addition, each reference numeral in each of FIGS. 24 and 25 is similar to that in FIGS. 23A and 23B except that 23 indicates the resin shaped product.

In addition, the plurality of resin shaped products for configuring the hollow impact absorption body are used in the aspect, but all of the plurality of resin shaped products used in the aspect may have the same shape, or may be used by combining the resin shaped products having different shapes. Here, as an example of the hollow impact absorption body in a case where all of the resin shaped products used in the aspect have the same shape, for example, the aspect illustrated in FIG. 24 can be employed. In addition, as an example of the hollow impact absorption body in a case where the resin shaped products having different shapes are combined, for example, the aspect illustrated in FIG. 25 can be employed. In the aspect, any of the aspects can be appropriately used. In addition, which aspect is employed can be appropriately determined in accordance with the use or the like of the resin-made impact absorption member of the aspect.

The thickness of the resin shaped product used in the aspect may be uniform in the entire product, or may be different according to the parts. As an aspect in which the thickness of the resin shaped product is different according to the parts, for example, an aspect in which the thicknesses are sequentially or continuously different with respect to the impact absorption direction, and an aspect in which the thicknesses are different in the flange portion and in the parts other than the flange portion, can be employed, but the invention is not limited thereto.

Figure 26:
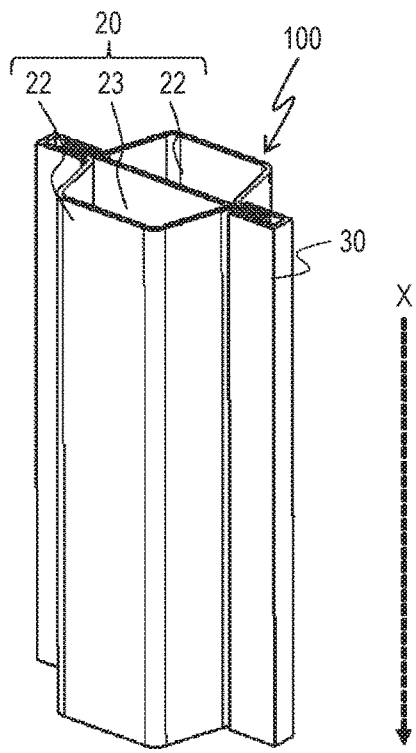
FIG. 26 is a schematic view illustrating another example of an impact absorption portion in a resin-made impact absorption member of the present invention.

The number of resin shaped products used for configuring the hollow impact absorption body in the aspect is not particularly limited if the number is at least equal to or greater than 2. Therefore, the hollow impact absorption body in the aspect may have the hollow structure by combining two resin shaped products, or may have the hollow structure by combining three or more resin shaped products. Here, as the hollow impact absorption body in which three or more resin shaped products are combined, for example, an example illustrated in FIG. 26 can be employed. In addition, the reference numerals in FIG. 26 are similar to those in FIGS. 23 to 25.

Among these, it is preferable that the hollow impact absorption body of the aspect is made by combining two resin shaped products. This is because, since it is possible to further simplify the structure by making the number of resin shaped products for configuring the hollow impact absorption body the minimum limit, the resin-made impact absorption member of the aspect has more excellent productivity, and simple adjustment of the impact absorption performance in accordance with the use is possible.

While the plurality of resin shaped products are combined to form the boundary portion as the flange portions come into contact with each other in the hollow impact absorption body in the aspect, the impact absorption auxiliary portion which will be described later is formed in the boundary portion to cover the boundary portion. In other words, the impact absorption auxiliary portion is engaged with the boundary portion, and has a function as a fastening tool which fastens the plurality of resin shaped products. Therefore, the flange portions of each resin shaped product in the boundary portion may be joined to each other, or may not be joined. This is because, even if the flange portions are not joined with each other, each resin shaped product is fixed by the function of the impact absorption auxiliary portion as a fastening tool. Furthermore, in the aspect, it is preferable that the flange portions of each resin shaped product are joined to each other in the boundary portion. This is because, since the plurality of resin shaped products can be more tightly combined as the flange portions are joined to each other, when the resin-made impact absorption member of the aspect absorbs the impact, it is possible to more effectively prevent deterioration of the impact absorption performance caused by the peeling of the flange portion in the boundary portion, and the impact absorption performance is easily achieved as initially designed.

In the boundary portion, an aspect in which flange portions are welded to each other is not particularly limited if the desired joining strength can be achieved. Therefore, an aspect in which the entire surface of the flange portion is joined, or an aspect in which a part of the flange portion is joined, may be employed.

In addition, as a joining method of the flange portions, for example, welding, such as oscillation welding or ultrasonic wave welding, adhering using an adhesive, or mechanical fastening, can be employed. In the aspect, it is possible to appropriately use any of the joining methods, but it is preferable that the welding method is used considering that the weight does not increase by the joining, and the weight reduction effect is not impeded by using the resin material.

[Impact Absorption Auxiliary Portion]

Next, the impact absorption auxiliary portion will be described. The impact absorption auxiliary portion is made of the resin material, and is formed to cover the boundary portion made by combining the flange portions of the plurality of resin shaped products to be in contact with each other. Hereinafter, the impact absorption auxiliary portion will be described in detail. In addition, the resin material will be described later.

The impact absorption auxiliary portion has at least two following functions. First, the impact absorption auxiliary portion functions to control and adjust the impact absorption performance of the impact absorption portion. The impact absorption performance of the impact absorption portion depends on the sectional area in the direction perpendicular to the impact absorption direction. Therefore, not only the sectional area in the direction perpendicular to the impact absorption direction of the hollow impact absorption body, but also the sectional area in the direction perpendicular to the impact absorption direction of the impact absorption auxiliary portion, also contributes to the impact absorption performance of the impact absorption portion. Therefore, by arbitrarily adjusting the sectional area of the impact absorption auxiliary portion, it is possible to change the sectional area of the entire impact absorption portion. In other words, by arbitrarily adjusting the sectional area of the impact absorption auxiliary portion, the sectional area of the hollow impact absorption body does not change, and it is possible to adjust and control the impact absorption performance as the entire impact absorption portion. Furthermore, even in a case where the impact absorption performance of the resin-made impact absorption member of the aspect is adjusted in accordance with the use, it is possible to use the hollow impact absorption body as a common body for all of the uses, and to arbitrarily adjust the impact absorption performance by changing the shape of the impact absorption auxiliary portion.

Secondly, the impact absorption auxiliary portion has a fastening function of the resin shaped product. As described above, the impact absorption auxiliary portion is formed to cover the boundary portion. Therefore, the impact absorption auxiliary portion is engaged with the plurality of resin shaped products which configure the hollow impact absorption body, and has a fastening function. In addition, by the fastening function, when the resin-made impact absorption member absorbs the impact, it is possible to prevent deterioration of impact absorption performance due to the peeling of the boundary portion, and to easily realize the impact absorption performance as initially designed.

While the impact absorption auxiliary portion is formed to cover the boundary portion, as an aspect in which the impact absorption auxiliary portion is formed to cover the boundary portion, an aspect in which the impact absorption auxiliary portion is formed to be integrated with the hollow impact absorption body, or an aspect in which the impact absorption auxiliary portion is formed as a component which is independent from the hollow impact absorption body, may be employed. Among these, it is preferable that the impact absorption auxiliary portion is formed as a component which is independent from the hollow impact absorption body. This is because, according to this, since it is possible to adjust and control the impact absorption performance by replacing the impact absorption auxiliary portion in accordance with the use of the resin-made impact absorption member, it is possible to employ the resin-made impact absorption member in any use.

Here, in a case where the impact absorption auxiliary portion is formed as a component which is independent from the hollow impact absorption body, the expression that the impact absorption auxiliary portion is "formed to cover the boundary portion", means that the impact absorption auxiliary portion formed as a component independent from the hollow impact absorption body is attached to the hollow impact absorption body to cover the boundary portion. In this case, an aspect in which the impact absorption auxiliary portion is attached to the hollow impact absorption body is not particularly limited if the impact absorption auxiliary portion can achieve two above-described functions. Therefore, a joining method, such as mechanical fastening using a bolt and a nut, oscillation welding, and ultrasonic wave welding, may be used, or without using the joining method, the impact absorption auxiliary portion only may be fitted to the boundary portion.

A method of fitting the impact absorption auxiliary portion to the boundary portion is not particularly limited if the above-described fastening function of the impact absorption auxiliary portion is obtained. In this aspect, simply, a method of nipping in the boundary portion by the impact absorption auxiliary portion (aspect A), or a fitting method of providing a recessed portion or an opening portion on the inside of the impact absorption auxiliary portion or on one boundary portion, providing the projected portion which can be fitted to the recessed portion or the opening portion on the other boundary portion, and fitting the projected portion to the recessed portion (aspect B), may be employed.

Figure 27A:
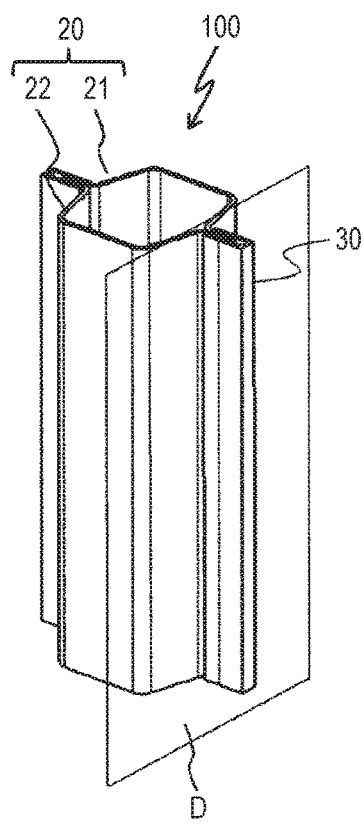
FIGS. 27A to 27B are schematic views illustrating another example of an impact absorption portion in a resin-made impact absorption member of the present invention.
Figure 27B:
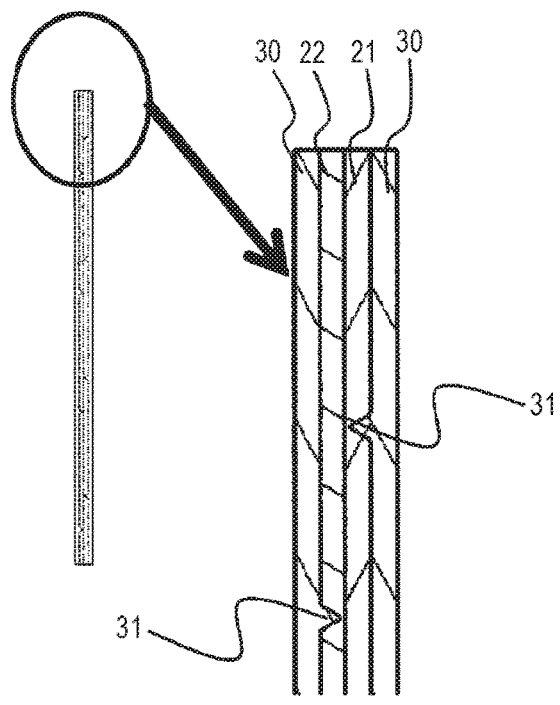

In a case of the aspect A, it is preferable that a projected shape for preventing a position between the boundary portion and the impact absorption auxiliary portion from being changed later, is provided at a part which is in contact with the boundary portion on the inner side of the impact absorption auxiliary portion. In addition, the projected shape may be triangular, rectangular, or hexagonal, but the triangular shape is preferable. FIGS. 27A to 27B are schematic views illustrating an example of a case where the projected shape is formed in the impact absorption auxiliary portion. As illustrated in FIGS. 27A to 27B, it is preferable that the impact absorption auxiliary portion 30 used in the aspect has a projected shape 31 for preventing the position between the boundary portion and the impact absorption auxiliary portion 30 from being changed later. In addition, FIG. 27B is a sectional view on a plane D of the flange portion in FIG. 27A.

Figure 28A:
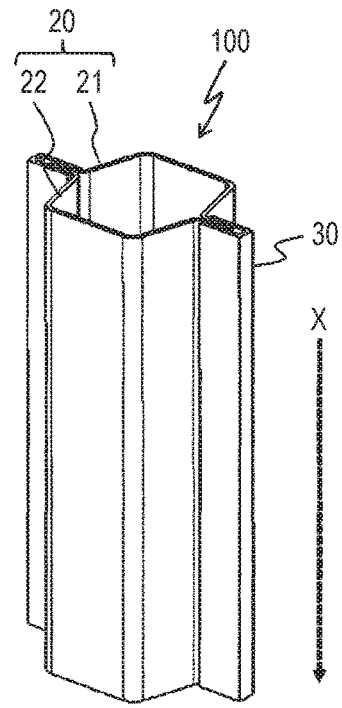
FIGS. 28A to 28B are schematic views illustrating another example of an impact absorption portion in a resin-made impact absorption member of the present invention.
Figure 28B:
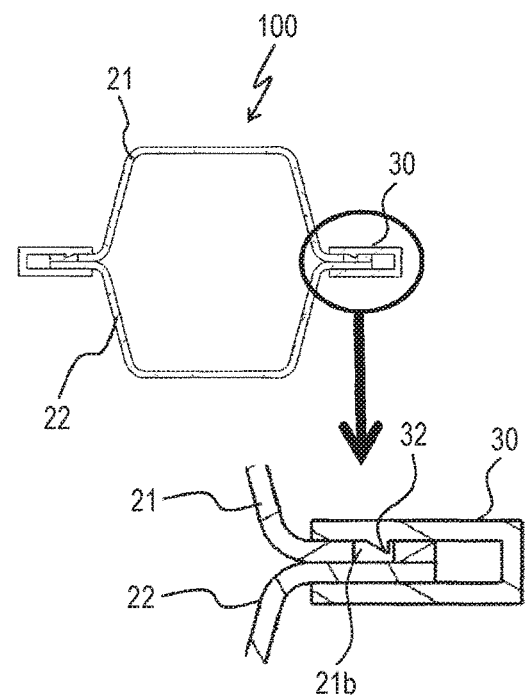

Meanwhile, the aspect B is advantageous that it is possible to realize cost reduction, such as unnecessary welding equipment or reduction of welding time. FIGS. 28A to 28B are schematic views illustrating an example of the aspect B. As illustrated in FIGS. 28A to 28B, an opening portion 21b may be provided at a part of the flange portion of the resin shaped product 21, a projected portion 32 which can be fitted to the opening portion 21b may be formed on the inner side of the impact absorption auxiliary portion 30, and the projected portion 32 may be fitted to the opening portion 21b.

Figure 29A:
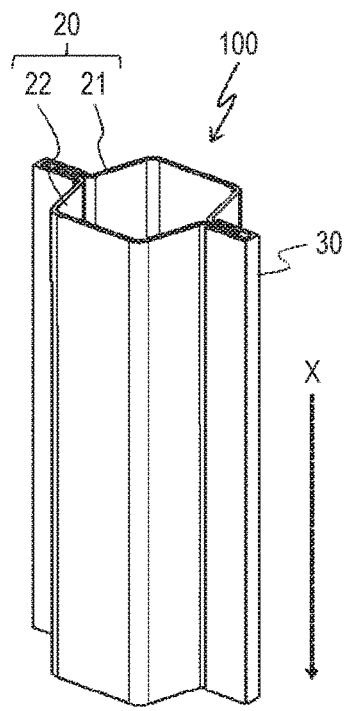
FIGS. 29A to 29B are schematic views illustrating another example of an impact absorption portion in a resin-made impact absorption member of the present invention.
Figure 29B:
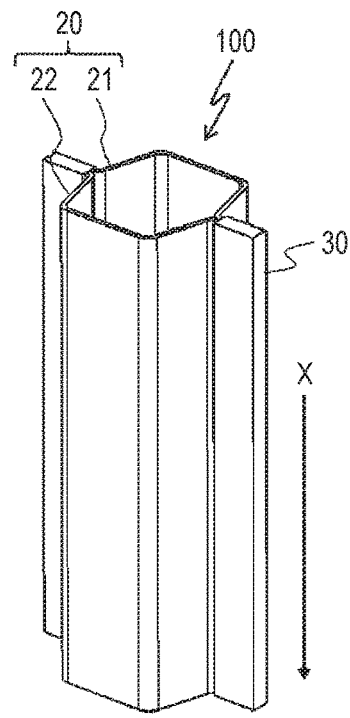

Next, an aspect in which the impact absorption auxiliary portion is formed to cover the boundary portion is not particularly limited if the impact absorption auxiliary portion achieves two above-described functions in accordance with the use or the like of the resin-made impact absorption member. Therefore, an aspect in which the impact absorption auxiliary portion is formed to cover the entire boundary portion, or an aspect in which the impact absorption auxiliary portion is formed to partially cover the boundary portion, may be employed. Therefore, for example, as illustrated in FIG. 29A, the impact absorption auxiliary portion 30 may be formed to cover only the end surface in the direction parallel to the impact absorption direction X of the boundary portion, or as illustrated in FIG. 29B, may be formed to cover the entire end surface of the boundary portion.

Figure 30:
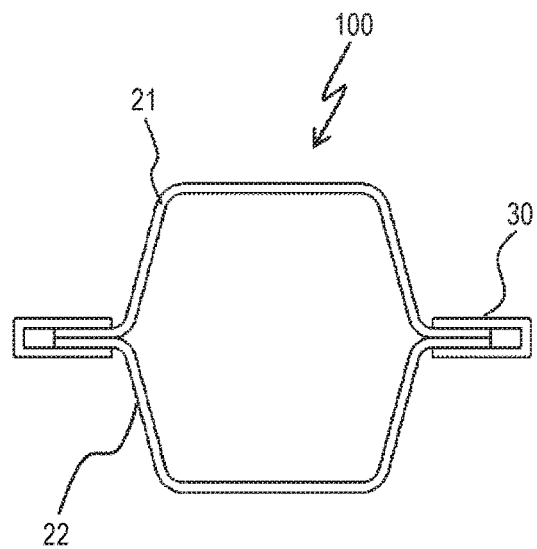
FIG. 30 is a schematic view illustrating another example of an impact absorption portion in a resin-made impact absorption member of the present invention.

In addition, the impact absorption auxiliary portion may be formed so that the end surface of the boundary portion and the inner surface of the impact absorption auxiliary portion are in contact with each other, or may be formed to have a space between the end surface of the boundary portion and the inner surface of the impact absorption auxiliary portion. In a case of the latter, since it is possible to form the impact absorption auxiliary portion without removing burrs even in a case where the burrs or the like are present on the end surface of the boundary portion, it is advantageous that the removing process of the burrs or the like can be omitted. FIG. 30 is a schematic view illustrating an example of a case where the space is provided between the end surface of the boundary portion and the inner portion of the impact absorption auxiliary portion. As illustrated in FIG. 30, the impact absorption auxiliary portion 30 is formed to have the space between the end surface of the boundary portion and the inner surface of the impact absorption auxiliary portion 30.

The shape of the impact absorption auxiliary portion is not particularly limited if it is possible to fit the boundary portion and combine the plurality of resin shaped products by forming the impact absorption auxiliary portion to cover the boundary portion, and to make the sectional area in the direction perpendicular to the impact absorption direction of the impact absorption portion be within the desired range. Therefore, the shape of the impact absorption auxiliary portion may be similar across the entire impact absorption direction, or in the impact absorption direction, the sectional area in the direction perpendicular to the impact absorption direction may vary. In a case of the latter, it is possible to control the impact absorption performance of the impact absorption portion as the sectional area varies in the impact absorption direction, and it is advantageous that the resin-made impact absorption member of the aspect is easily provided with the impact absorption performance in accordance with the use.

An aspect in which the sectional area of the impact absorption auxiliary portion varies in the impact absorption direction is not particularly limited if the impact absorption performance of the predetermined impact absorption portion can be achieved in accordance with the use or the like of the resin-made impact absorption member of the aspect. As an aspect, for example, an aspect in which the sectional area is formed to increase along the impact absorption direction, or an aspect in which the sectional area is formed to vary regularly or irregularly along the impact absorption direction, can be employed. In the aspect, the impact absorption auxiliary portion of any of the aspects can be appropriately used, but among these, an aspect in which the sectional area is formed to increase along the impact absorption direction is preferable. This is because, according to this, since the impact absorption portion used in the aspect can improve the impact absorption performance as the impact absorption advances, even in a case where large impact is applied, it is possible to prevent the impact absorption performance from being damaged as the impact absorption portion is completely damaged. In addition, as an example of the case where the sectional area is formed to increase along the impact absorption direction in the impact absorption auxiliary portion, for example, an example illustrated in FIGS. 23A and 23B can be employed. In addition, as an example of a case where the sectional area is formed to vary regularly or irregularly along the impact absorption direction, for example, an example illustrated in FIG. 31 can be employed.

In an aspect in which the sectional area of the impact absorption auxiliary portion is formed to increase along the impact absorption direction, a ratio between the sectional area on the tip end side which receives the impact and the sectional area on the other end side, is not particularly limited if the ratio may be appropriately adjusted within a range in which the predetermined impact absorption performance of the impact absorption portion can be achieved. Among these, in a case where the sectional area of the impact absorption auxiliary portion is formed to increase along the impact absorption direction, it is preferable that a ratio A/B between the sectional area A on the tip end side which receives the impact and the sectional area B on the other end side, is 0<A/B<1.

Figure 32:
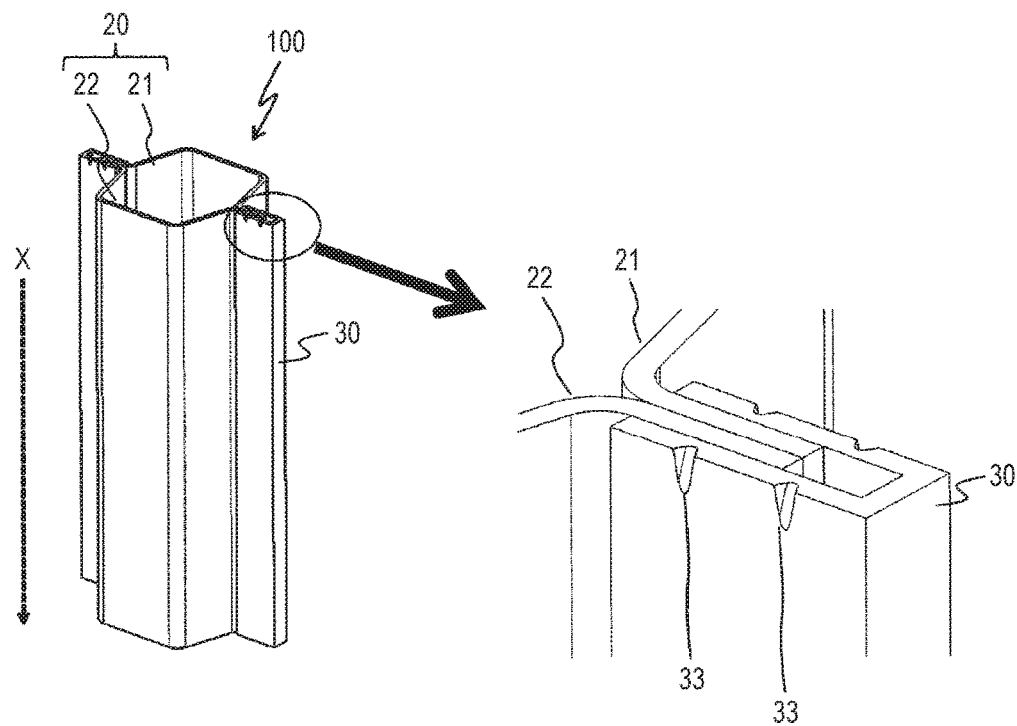
FIG. 32 is a schematic view illustrating another example of an impact absorption portion in a resin-made impact absorption member of the present invention.

A part of the impact absorption auxiliary portion may have a linearly recessed portion parallel to the impact absorption direction. This is because, as the linearly recessed portion is provided and the sectional area is reduced, since it is possible to induce the buckling of the position at which the linearly recessed portion is formed when the resin-made impact absorption member of the aspect absorbs the impact, a degree of freedom of the design of the impact absorption performance further widens. FIG. 32 is a schematic view illustrating an example of a case where the linearly recessed portion is provided for the impact absorption auxiliary portion. As illustrated in FIG. 32, the impact absorption auxiliary portion 30 may have a linearly recessed portion 33 parallel to the impact absorption direction X.

In addition, in FIG. 32, as an example in which the linearly recessed portion is formed, an aspect in which the linearly recessed portion is formed only at the tip end of the impact absorption auxiliary portion is illustrated, but an aspect in which the linearly recessed portion is formed is not limited to the aspect, and for example, the linearly recessed portion may be formed across the entire impact absorption direction of the impact absorption auxiliary portion.

In addition, a specific shape, such as the number, the depth, the width, or the length of the linearly recessed portion may be appropriately adjusted so that a buckling start position can be at a predetermined position when the impact is applied to the impact absorption portion, in accordance with the use or the like of the resin-made impact absorption member.

Next, the resin material used in the impact absorption auxiliary portion will be described.

The resin material is not particularly limited if the desired impact absorption performance can be achieved in accordance with the use of the resin-made impact absorption member or the structure of the impact absorption portion. Therefore, the resin material may include the thermoplastic resin, or may include a thermosetting resin. As the thermoplastic resin, the same resin described in the thermoplastic resin contained in the fiber-reinforced resin material can be employed.

[Thermosetting Resin]

In a case of the thermosetting resin, examples of the thermosetting resin used in the aspect can include: a cured product, such as an epoxy resin, a vinyl ester resin, an unsaturated polyester resin, a diallyl phthalate resin, a phenol resin, a maleimide resin, a cyanate resin, a benzoxazine resin, and a dicyclopentadiene resin; and a modified product thereof. The epoxy resin is not particularly limited if an epoxy group is contained in the molecule, and examples thereof can include a bisphenol A type epoxy resin, a bisphenol F type epoxy resin, a phenol novolak type epoxy resin, a cresol novolak type epoxy resin, a bisphenol AD type epoxy resin, a bisphenol type epoxy resin, a naphthalene type epoxy resin, an alicyclic epoxy resin, a glycidyl ester based resin, a glycidyl amine epoxy based resin, a heterocyclic epoxy resin, a diaryl sulfone type epoxy resin, a hydroquinone type epoxy resin, and modified products thereof. In addition, the thermosetting resin used in the aspect may be only one type, or may be two or more types.

The resin material used in the impact absorption auxiliary portion may contain the reinforcing fiber. In this case, as the resin material used in the impact absorption auxiliary portion, it is preferable to use the fiber-reinforced resin material.

[Manufacturing Method of Resin-Made Impact Absorption Member]

Next, a manufacturing method of the resin-made impact absorption member of the present invention will be described. The resin-made impact absorption member of the present invention can be obtained by manufacturing the above-described impact absorption portion. The impact absorption portion in the present invention can be manufactured by using a generally known method, and for example, a method of heating a reinforcing fiber resin material to the temperature which is equal to or greater than a softening point in advance, and next, performing cold pressing by a mold having the temperature which is lower than the softening point of the thermoplastic resin that configures the reinforcing fiber resin material, can be employed. In addition, a hot pressing method of cooling the temperature to be lower than the softening point of the thermoplastic resin after inputting the reinforcing fiber resin material into the mold having the temperature which is equal to or greater than the softening point of the thermoplastic resin and pressing the reinforcing fiber resin material, can be employed, but the invention is not limited thereto.

[Use of Resin-Made Impact Absorption Member]

The resin-made impact absorption member of the present invention is a resin-made impact absorption member which includes the impact absorption portion of the hollow structure made of the outer cylindrical portion and the hollow portion, and is used for suppressing the impact to the other side by absorbing the impact energy input to one end of the resin-made impact absorption member by the impact absorption portion. The resin-made impact absorption member of the present invention assumes the so-called impact absorption with respect to the axial compressive direction, and is against the impact received in the direction coaxial to the penetrating direction of the hollow structure of the impact absorption portion. In addition, the resin-made impact absorption member of the present invention can be employed in various vehicular components for a simple structure.

[Vehicular Component]

The vehicular component of the present invention is configured of the above-described resin-made impact absorption member of the present invention. The vehicular component of the present invention is not particularly limited if the resin-made impact absorption member of the present invention is used, and examples thereof can include a crash box, a front side member, a rear side member, a front wheel house upper member, and a lower member.

In addition, since the vehicular component of the present invention may use the above-described resin-made impact absorption member of the present invention, for example, the vehicular component may be made only of the resin-made impact absorption member of the present invention, or the resin-made impact absorption member of the present invention may be combined with other components. In addition, another component is appropriately determined in accordance with the use of the vehicular component of the present invention, and is not particularly limited. In addition, the material which configures another component may be appropriately determined in accordance with the use of the vehicular component of the present invention, and can use an arbitrary resin material or an arbitrary metal material.

The present invention is not limited to the above-described embodiment. The above-described embodiment is an example, and any aspect in which a configuration is practically the same as the technical idea of the present invention and similar action effects are achieved, is included in the technical range of the present invention.

Next, the resin-made impact absorption member described in the following (2-1) to (2-6) will be described. The resin-made impact absorption member described in the following (2-1) to (2-6) is also called a "second aspect".

(2-1)

A resin-made impact absorption member including: an impact absorption portion constituted by an impact absorption base material having a substantially constant thickness, in which the impact absorption base material includes a plurality of thermoplastic resin base materials combined in the impact absorption direction, the thermoplastic resin base materials having different compressive strengths.

(2-2)

The resin-made impact absorption member described in (2-1), in which, in the impact absorption base material, the plurality of thermoplastic resin base materials are disposed in order of increasing the compressive strength toward the rear end side from the tip end side which receives the impact.

(2-3)

The resin-made impact absorption member described in (2-1) or (2-2), in which the plurality of thermoplastic resin base materials include a fiber-reinforced resin thermoplastic resin composite material containing a reinforcing fiber and a thermoplastic resin.

(2-4)

The resin-made impact absorption member described in (2-3), in which, in the plurality of thermoplastic resin base materials, the compressive strengths are different as volume fractions of the reinforcing fibers are different from each other.

(2-5)

The resin-made impact absorption member described in any one of (2-1) to (2-4), in which, in the impact absorption base material, the adjacent thermoplastic resin base materials are combined so that the abundance continuously changes in a thickness direction in a boundary of the adjacent thermoplastic resin base materials.

(2-6)

The resin-made impact absorption member described in any one of (2-1) to (2-5), in which the impact absorption portion has a cylindrical shape having a hollow structure.

Figure 14A:
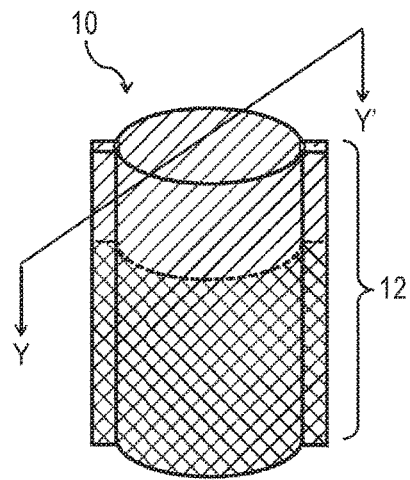
FIGS. 14A and 14B are schematic views illustrating an example of a resin-made impact absorption member of the present invention.
Figure 14B:
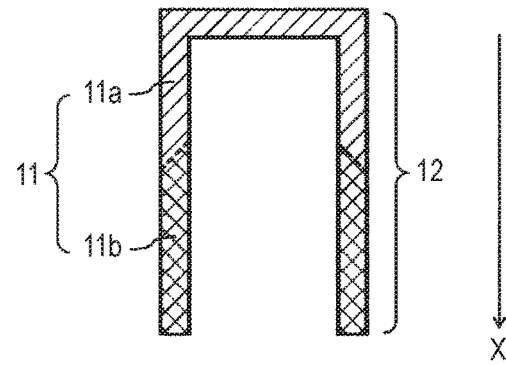

FIGS. 14A to 14B are schematic views illustrating an example of a resin-made impact absorption member of a second aspect.

FIGS. 15A to 15E are schematic views illustrating an example of a combined aspect of a thermoplastic resin base material in the second aspect.

FIG. 16 is a schematic view illustrating an example of an aspect in which the thermoplastic resin base material is disposed in an impact absorption base material in the second aspect.

FIG. 17 is a schematic view illustrating another example of the combined aspect of the thermoplastic resin base material in the second aspect.

Figure 18A:
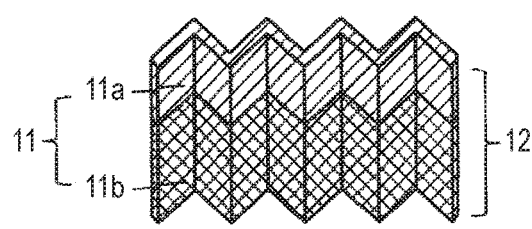
FIGS. 18A to 18C are schematic views illustrating an example of a case where an impact absorption portion has a shape of a plate.
Figure 18B:
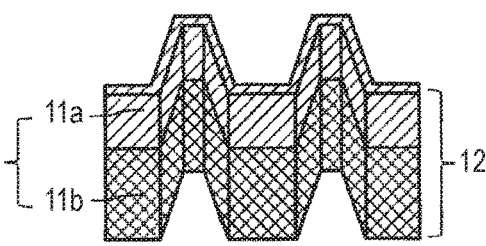
Figure 18C:
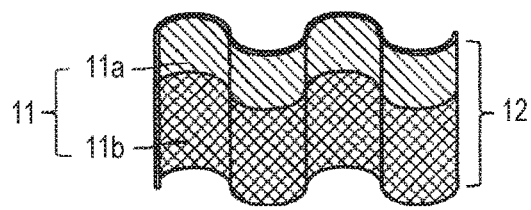

FIGS. 18A to 18C are schematic views illustrating an example of a case where the impact absorption portion has a shape of a plate in the second aspect.

FIGS. 19A to 19B are schematic views illustrating an example of a case where the impact absorption portion is cylindrical in the second aspect.

FIGS. 20A to 20B are schematic views illustrating another example of the resin-made impact absorption member of the second aspect.

FIG. 21 is a schematic view illustrating another example of the resin-made impact absorption member of the second aspect.

Figure 22A:
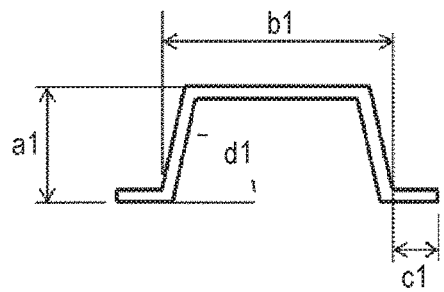
FIGS. 22A to 22B are schematic views of the impact absorption portion in a resin-made impact absorption member of the present invention.
Figure 22B:
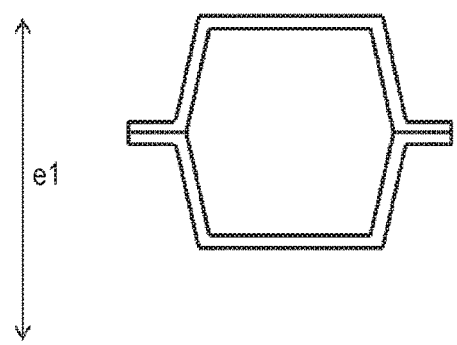

FIGS. 22A to 22B are schematic views of the impact absorption portion in the resin-made impact absorption member of the second aspect.

The second aspect relates to a resin-made impact absorption member made of the resin material, and more specifically to a resin-made impact absorption member which uses the thermoplastic resin.

Since the resin-made impact absorption member described in Patent Document 3 is made of a single resin material, there is a concern that a sudden load is generated during the impact absorption or the impact absorption performance is not obtained as initially designed. In addition, there is a tendency that the impact absorption performance is not sufficient compared to the metal-made impact absorption member, for example, a function that the impact should be absorbed corresponding to the collision speed of at least a second level as an operation sensor of an airbag is not achieved. Therefore, a problem that the target impact absorption performance cannot be achieved by the resin-made impact absorption member according to the use or the like of the impact absorption member, is pointed out.

In order to solve the problem, a method of optimizing the impact absorption performance of the resin-made impact absorption member not by strengthening the strength of the tip end portion to which the impact is applied, but by strengthening the strength of the rear end portion in the resin-made impact absorption member. As a specific method, for example, a method of increasing the thickness of the rear end portion to be thicker than that of the tip end portion to which the impact is applied, is reviewed. However, in the aspect in which the thickness changes, there are problems that (1) the boundary of the thickness becomes the starting point of the damage and sufficient impact absorption performance cannot be achieved in a case where large impact or impact from the diagonal direction is applied, (2) the attachment portion attached to the component in the periphery becomes weak since the thickness in the vicinity of the tip end portion which receives the impact becomes thin, (3) while the resin-made impact absorption member is generally manufactured by a press molding method, the boundary of the thickness changes to be corresponded to the change in the absorbed energy amount, or in a case where the entire thickness changes, it is necessary to change the mold for the press molding, and it is difficult to perform a simple design change and manufacturing of the resin-made impact absorption member, and (4) in a case where great fluid molding is performed by using the fiber-reinforced resin material into which the fibers are mixed as the resin material, the fiber orientation is generated during the press molding and the performance is not obtained as designed.

The second aspect considers each of the problems, and a main object thereof is to provide a resin-made impact absorption member which is constituted by the resin material and is easily and freely design the light weight and the impact absorption performance.

The resin-made impact absorption member of the second aspect achieves an effect that the light weight and the impact absorption performance are freely designed.

Here, the "impact absorption direction" in the second aspect means the direction in which the impact absorption portion is crushed toward the rear end side from the tip end side which receives the impact when the impact is input to the resin-made impact absorption member of the second aspect from the outside. In a case where the impact absorption portion has a cylindrical shape having a hollow structure in the resin-made impact absorption member of the second aspect, the impact absorption direction is generally the direction parallel to the axial direction of the hollow structure.

The resin-made impact absorption member of the second aspect will be described with reference to the drawings. FIGS. 14A to 14B are schematic views illustrating an example of the resin-made impact absorption member of the second aspect. FIG. 14B is a sectional view when viewed from a line arrow Y-Y' of FIG. 14A. As illustrated in FIGS. 14A and 14B, a resin-made impact absorption member 10 of the second aspect includes the impact absorption portion 12 constituted by the impact absorption base material 11 having a substantially constant thickness, and in the impact absorption base material 11, the plurality of the thermoplastic resin base materials 11a and 11b in which the compressive strength varies in the impact absorption direction X are combined. Here, the thermoplastic resin base materials 11a and 11b in FIGS. 14A to 14B have different compressive strengths from each other (hereinafter, the same in the specification).

According to the resin-made impact absorption member of the second aspect, as the thickness of the impact absorption base material is substantially constant, regardless of the size of the impact or the direction of the impact, it is possible to prevent the boundary of the plurality of thermoplastic resin base materials having different the compressive strengths from becoming the starting point of the damage in the impact absorption base material. Therefore, it is possible to achieve excellent impact absorption performance regardless of the level or the like of the impact applied to the resin-made impact absorption member of the second aspect. In addition, as the plurality of thermoplastic resin base materials having different compressive strengths are combined, the impact absorption base material in the second aspect can form a region having different compressive strengths in the impact absorption portion without changing the thickness of the impact absorption base material. Therefore, for example, it is possible to adjust the position of the boundary without changing the press mold, and to freely design and control the impact absorption performance. Furthermore, as the impact absorption base material is made of the thermoplastic resin base material in the second aspect, it is possible to remarkably reduce the weight compared to the metal-made resin-made impact absorption member. Due to this, according to the second aspect, it is possible to obtain the resin-made impact absorption member which can freely design the light weight and the impact absorption performance.

In the resin-made impact absorption member of the second aspect, it is preferable that the impact absorption portion has a cylindrical shape having the hollow structure. This is because, according to this, since the damage during the impact absorption can be generated at all of the parts across the entire resin-made impact absorption member while being light, it is possible to absorb large impact as stable damage continuously advances, and the impact absorption efficiency per the member weight of the resin-made impact absorption member increases.

The resin-made impact absorption member of the second aspect is similar to that of the above-described aspect of the present invention except that the impact absorption portion can employ a free shape without necessity of having the hollow structure, it is not necessary to contain reinforcing fibers in the thermoplastic resin base material, and it is possible to employ the thermoplastic resin base material without restricting the physical properties if the material contains the thermoplastic resin. However, in the resin-made impact absorption member of the second aspect, the impact absorption portion may have the hollow structure, and it is preferable to contain the reinforcing fibers in the thermoplastic resin base material. The reinforcing fiber is similar to that described in the above-described aspect of the present invention.

The resin-made impact absorption member of the second aspect can be manufactured, for example, by the following method. In other words, first, two types of the thermoplastic resin base material in which the thermoplastic resin and the reinforcing fiber are integrated in advance and which have different compressive strengths, are prepared, a recessed or projected shape is press-molded by inputting the two types of thermoplastic resin base materials to a predetermined position in the predesigned mold, and the two types of thermoplastic resin base materials are combined at the same time when the press molding is performed. The resin-made impact absorption member including the cylindrical impact absorption portion is made by fastening the shaped products of the impact absorption base material obtained in this manner by oscillation welding so that the recessed portions are oriented to each other and a closed section is formed. In addition, the fastening method of the shaped products can use ultrasonic wave welding, adhering, a rivet, or a bolt and a nut, other than the oscillation welding.

The resin-made impact absorption member of the second aspect can be used, for example, as an impact absorption body which absorbs and mitigates the impact during the vehicle collision being combined to a skeleton structure of the vehicle. In particular, the resin-made impact absorption member can be used in a supporting member on the inside of the bumper mounted in a car, or a vehicle body structure, such as a pillar, impact absorption member installed on the inside of a side sill, a side member, or a cross member.

Next, the resin-made impact absorption member described in the following (3-1) to (3-7) will be described. The resin-made impact absorption member described in the following (3-1) to (3-7) is also referred to as a "third aspect".

(3-1)

A resin-made impact absorption member including: an impact absorption portion which includes a hollow impact absorption body which is a hollow structure body in which a plurality of resin shaped products having flange portions including a first resin material are combined so that a boundary portion is formed as the flange portions come into contact with each other; and an impact absorption auxiliary portion which is formed to cover the boundary portion including a second resin material.

(3-2)

The resin-made impact absorption member described in (3-1), in which, in the impact absorption auxiliary portion, a sectional area in the direction perpendicular to the impact absorption direction of the impact absorption portion varies in the impact absorption direction.

(3-3)

The resin-made impact absorption member described in (3-2), in which, in the impact absorption auxiliary portion, the sectional area is formed to increase along the impact absorption direction.

(3-4)

The resin-made impact absorption member described in any one of (3-1) to (3-3), in which the boundary portion is covered by the impact absorption auxiliary portion to have a space between an end surface of the boundary portion and an inner surface of the impact absorption auxiliary portion at least at a part thereof.

(3-5)

The resin-made impact absorption member described in any one of (3-1) to (3-4), in which the flange portions which configure the boundary portion are joined to each other.

(3-6)

The resin-made impact absorption member described in any one of (3-1) to (3-5), in which the first resin material or the second resin material is a containing a reinforcing fiber and a matrix resin.

(3-7)

A vehicular component which uses the resin-made impact absorption member described in any one of (3-1) to (3-6).

FIGS. 23A to 23B are schematic views illustrating an example of an impact absorption portion in a resin-made impact absorption member of a third aspect.

FIG. 24 is a schematic view illustrating another example of the impact absorption portion in the resin-made impact absorption member of the third aspect.

FIG. 25 is a schematic view illustrating another example of the impact absorption portion in the resin-made impact absorption member of the third aspect.

FIG. 26 is a schematic view illustrating another example of the impact absorption portion in the resin-made impact absorption member of the third aspect.

FIGS. 27A to 27B are schematic views illustrating another example of the impact absorption portion in the resin-made impact absorption member of the third aspect.

FIGS. 28A to 28B are schematic views illustrating another example of the impact absorption portion in the resin-made impact absorption member of the third aspect.

FIGS. 29A to 29B are schematic views illustrating another example of the impact absorption portion in the resin-made impact absorption member of the third aspect.

FIG. 30 is a schematic view illustrating another example of the impact absorption portion in the resin-made impact absorption member of the third aspect.

Figure 31:
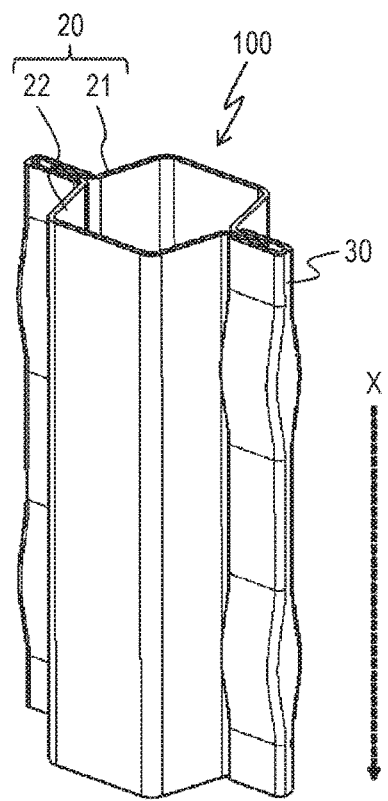
FIG. 31 is a schematic view illustrating another example of an impact absorption portion in a resin-made impact absorption member of the present invention.

FIG. 31 is a schematic view illustrating another example of the impact absorption portion in the resin-made impact absorption member of the third aspect.

FIG. 32 is a schematic view illustrating another example of the impact absorption portion in the resin-made impact absorption member of the third aspect.

Figure 33:
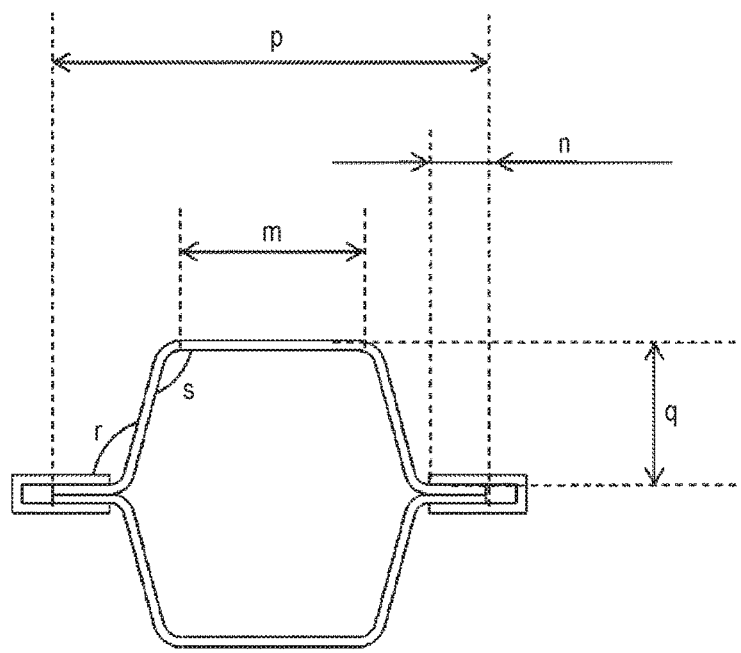
FIG. 33 is a view illustrating a dimension of an example of an impact absorption portion in the present invention.

FIG. 33 is a view illustrating a dimension of an example of the impact absorption portion in the third aspect.

Figure 34:
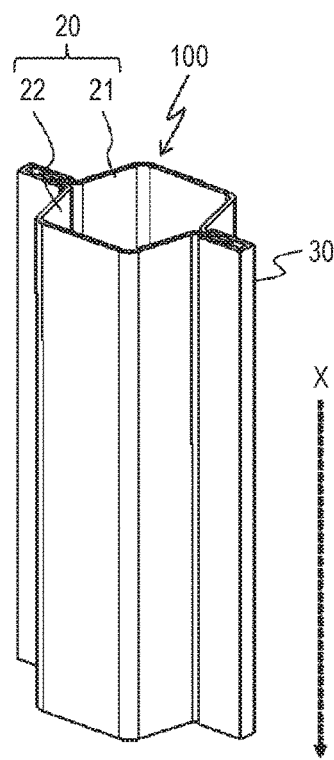
FIG. 34 is a schematic view illustrating an example of an impact absorption portion in the present invention.

FIG. 34 is a schematic view illustrating an example of the impact absorption portion in the third aspect.

Figure 37:
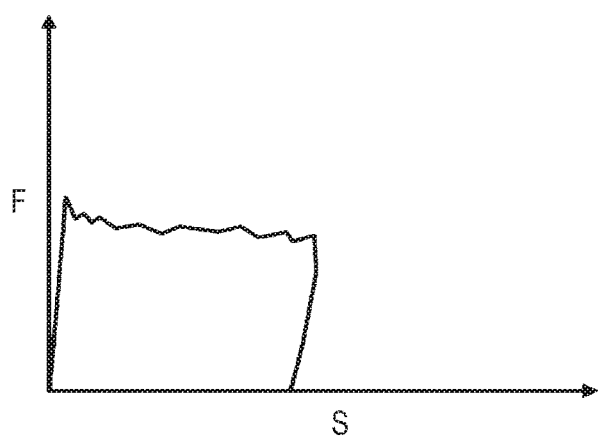
FIG. 37 is a graph illustrating another example of a load-displacement curve.

FIG. 37 is a graph illustrating an example of a load-displacement curve of the impact absorption portion in third aspect.

The third aspect relates to a resin-made impact absorption member made of the resin material, and more specifically to a resin-made impact absorption member having excellent impact absorption performance by providing the impact absorption portion having a specific hollow structure.

It is necessary to appropriately change the design of the impact absorption member so as to provide appropriate impact absorption performance in accordance with the use thereof. However, in the resin-made impact absorption member described in the Patent Documents 4 to 6, as described above, since the structure is complicated, it is necessary to change the shape of the component or the number of the components every time the impact absorption performance is adjusted. Therefore, in the resin-made impact absorption member described in the Patent Documents 4 to 6, it is difficult to realize appropriate impact absorption performance in accordance with the use thereof, and there are many cases where the use is restricted.

Furthermore, in the resin-made impact absorption member, there is a problem regarding the joining in addition to the above-described problems. In other words, as a method of joining the components made of the resin material to each other, in general, means, such as heat welding or mechanical fastening, is used. However, in a case of the mechanical fastening, there is a case where the weight increases by a rivet, a bolt, or a nut which is used for the mechanical fastening, and it is not possible to realize sufficient reduction of the weight by using the resin material. Meanwhile, in a case of the heat welding, when an axial compression test is performed with respect to the resin-made impact absorption member made of the plurality of components joined by the heat welding, a situation in which the joining surfaces of the components are peeled, and the impact absorption performance cannot be achieved as initially designed, is also found.

Considering each of the above-described problems, a main object of the third aspect is to provide the resin-made impact absorption member which can easily adjust the impact absorption performance in accordance with the use by a simple structure.

In order to solve the problems, by employing the impact absorption structure which configures the resin-made impact absorption member by combining a plurality of members, and which can control the impact absorption performance only by performing the change of a specific component, the adjustment of the impact absorption performance which corresponds to the use becomes easy, and even during the shape change generated by the design, the change is possible without reaching the entire component, and the third aspect is completed.

The resin-made impact absorption member of the third aspect can achieve an effect that the adjustment of the impact absorption performance which corresponds to the use is easy by a simple structure.

In absorbing the energy more efficiently in the resin-made impact absorption member having the hollow structure, when loading the impact load, each component should be present and maintain the closed section until the absorption of the energy is completed. However, since the closed section is not present when the joining point in which the components are joined to each other is peeled, it becomes difficult to absorb the energy more. Therefore, in order to perform stable energy absorption, it is necessary to continue to reliably join the components to each other until the absorption of the energy is completed. At this point, since the impact absorption portion in the resin-made impact absorption member of the third aspect has a structure in which the impact absorption auxiliary portion covers the boundary portion, it is possible to prevent the boundary portion from being peeled during the impact absorption.

In addition, by appropriately changing the shape of the impact absorption auxiliary portion according to the third aspect, it is possible to expect various effects. For example, by providing a linearly recessed shape perpendicular to the impact absorption direction at a part of the impact absorption auxiliary portion, it is possible to buckle the impact absorption portion at a position at which the recessed shape is formed during the energy absorption, and to start the absorption of the energy. Furthermore, in a case where the impact absorption performance is desired to be improved, for example, the performance can be improved only by increasing the thickness of the impact absorption auxiliary portion, or by appropriately changing the shape. In other words, according to the resin-made impact absorption member of the third aspect, only by increasing the thickness of the hollow impact absorption body which is a main component that configures the impact absorption portion, or by changing the thickness or the shape of the impact absorption auxiliary portion without changing the shape, it is possible to adjust the impact absorption performance in accordance with the use. In general, since there are many cases where the component which uses the metal has a shape having a constant thickness of the component, when changing the thickness for adjusting the impact absorption performance, there is also a case where the material which has been used until that moment cannot be reusable and the use thereof become impossible, and the material becomes useless. However, in the third aspect, when adjusting the impact absorption performance, it is possible to perform only the change of an auxiliary member without necessity of changing the thickness of the hollow impact absorption body.

Furthermore, according to the third aspect, since it is possible to cover the burrs generated when performing the heat welding with respect to the flange portion, particularly the oscillation welding, by considering the shape of the impact absorption auxiliary portion and by providing a space with respect to the flange portion, it is possible to expect to omit the processing of the flange portion.

By absorbing the impact energy input to one end of the resin-made impact absorption member by the impact absorption portion, the resin-made impact absorption member of the third aspect is used for controlling the impact to the other end side. In addition, the resin-made impact absorption member of the third aspect assumes the so-called impact absorption with respect to the axial compressive direction, and is used for absorbing the impact received in the direction coaxial to the penetrating direction of the hollow structure of the impact absorption portion. However, as the above-described impact absorption auxiliary portion is present, the rigidity with respect to a torsional load which acts in the direction perpendicular to the axial compressive direction and is applied to the component, is achieved. Hereinafter, the "direction coaxial to the penetrating direction of the hollow structure of the impact absorption portion" is referred to as the "impact absorption direction".

In addition, the "impact absorption characteristics" indicate a value obtained by dividing the absorbed impact energy amount by the component weight of a part which is damaged during the absorption, and means that the "impact absorption characteristics" becomes excellent as the value increases.

Figure 36:
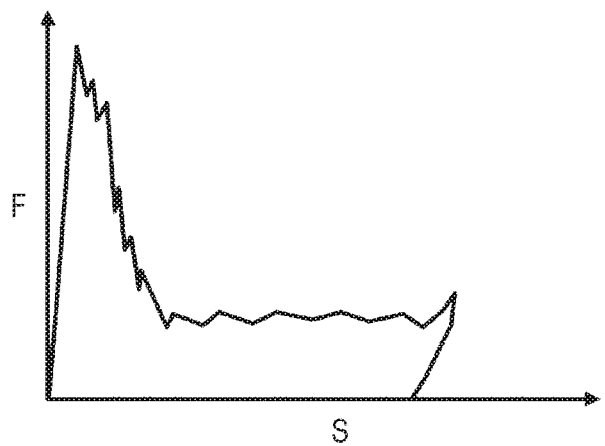
FIG. 36 is a graph illustrating an example of a load-displacement curve.

In addition, the impact energy input from one end of the resin-made impact absorption member of the third aspect is absorbed by the impact absorption portion, but the impact absorption mechanism uses a crushing phenomenon of the impact absorption portion in the impact absorption direction. In other words, in general, when the impact is applied to the impact absorption portion, as illustrated in FIG. 36, while absorbing the impact load F, the displacement S is generated due to the crushing phenomenon, and an area surrounded by the curve between the impact load F and the displacement S becomes the absorbed impact energy amount. The crushing phenomenon is made of the compression failure in the impact absorption direction, and the buckling phenomenon generated according thereto. However, by the buckling phenomenon, as illustrated in FIG. 36, since the load applied after the initial impact load decreases to be lower than the initial impact load, the displacement increases for achieving the desired impact absorption. When the displacement increases, it is also necessary to increase the impact absorption portion as much as the displacement, and thus, the large displacement is not preferable. In addition, when the impact load during the impact absorption is large, the impact received by the passenger during the collision increases, and thus, the large impact load is not preferable. Accordingly, in the impact absorption portion, as illustrated in FIG. 37, it is preferable that the impact load with respect to the displacement is designed to be constant so that the maximum impact load and the displacement decrease.

In order to obtain the above-described stable impact absorption performance, it is necessary to reduce the pitch (hereinafter, referred to as a "buckling pitch") of the buckling phenomenon occurred during the crushing phenomenon. In a case where the buckling pitch is high, since the impact load rapidly decreases according to the buckling, the displacement required for absorbing the desired impact energy amount becomes increase. Therefore, in order to obtain the stable impact absorption performance, the design which repeats the low buckling pitch and does not cause a rapid decrease in the impact load, is necessary. By using the impact absorption portion which has the above-described specific hollow structure, the resin-made impact absorption member of the third aspect realizes reducing the buckling pitch, and maintaining the closed section, and thus, realizes the stable impact absorption performance.

The resin-made impact absorption member of the third aspect includes at least the impact absorption portion, and has another configuration element as necessary.

The resin-made impact absorption member of the third aspect is similar to the resin-made impact absorption member described in the above-described aspects of the present invention except that it is not mandatory for the hollow structure of the impact absorption portion to satisfy a specific parameter, the material (first resin material) used in the impact absorption portion is not particularly limited if the material is the resin material, and it is not mandatory to use the fiber-reinforced resin material. As the first resin material and the second resin material of the third aspect, the resin material described in the impact absorption auxiliary portion of the above-described aspects of the present invention can be used. In the impact absorption portion of the third aspect, it is preferable that the maximum value of $L1/t1$ may be equal to or less than 40, and the fiber-reinforced resin material is used as the resin material.

(Manufacturing Method of Fiber-Reinforced Resin Material)

Next, the manufacturing method of the fiber-reinforced resin material used in the third aspect will be described. The fiber-reinforced resin material used in the third aspect can be manufactured by using a generally known method. For example, in a case where the thermoplastic resin is used as the matrix resin, it is possible to manufacture the fiber-reinforced resin material by 1. the process of cutting the reinforcing fiber, 2. the process of opening the cut reinforcing fiber, and 3. the process of obtaining the prepreg by heat-compressing after mixing the opened reinforcing fiber and the fiber-shaped or particle-shaped thermoplastic resin, but the invention is not limited thereto. In addition, in this method, the prepreg is the fiber-reinforced resin material.

The first resin material and the second resin material which are used in the third aspect may be the same, or may be different from each other. An aspect in which the first resin material and the second resin material are different from each other is not particularly limited if the desired impact absorption performance can be given to the impact absorption portion used in the third aspect. As the aspect, for example, an aspect in which the fiber-reinforced resin material is used as one of the first resin material and the second resin material, and the thermoplastic resin or the thermosetting resin is used in the other one, or an aspect in which the fiber-reinforced resin material, in which the average fiber lengths of the reinforcing fiber, the volume fractions of the reinforcing fiber, and the types of the matrix resin are different from each other, is used as the first resin material and the second resin material, can be employed, but the invention is not limited thereto.

(Resin-Made Impact Absorption Member)

As described above, the resin-made impact absorption member of the third aspect includes at least the above-described impact absorption portion, but another configuration element other than the impact absorption portion may be provided within a range of not damaging the third aspect. As another configuration element used in the third aspect, in accordance with the use or the like of the resin-made impact absorption member of the third aspect, a configuration element can be appropriately selected within the range of not damaging the purpose of the third aspect, and although not particularly limited, for example, a flange member for connecting to a component in the periphery can be employed.

Next, a manufacturing method of the resin-made impact absorption member of the third aspect will be described. The resin-made impact absorption member of the third aspect can be obtained by manufacturing the above-described impact absorption portion. The impact absorption portion in the third aspect can be manufactured by using a generally known method, and for example, in a case where the fiber-reinforced resin material containing the reinforcing fibers and the thermoplastic resin is used as the first resin material and the second resin material, a method of heating the fiber-reinforced resin material to the temperature which is equal to or greater than a softening point in advance, and next, performing the cold pressing by the mold having the temperature which is lower than the softening point of the thermoplastic resin that constitutes the fiber-reinforced resin material, can be employed. In addition, the hot pressing method of cooling the temperature to be lower than the softening point of the thermoplastic resin after inputting the fiber-reinforced resin material into the mold having the temperature which is equal to or greater than the softening point of the thermoplastic resin and pressing the fiber-reinforced resin material, can be employed, but the invention is not limited thereto.

By absorbing the impact energy input to one end of the impact absorption portion by the impact absorption portion, the resin-made impact absorption member of the third aspect is used for suppressing the impact to the other end side. The resin-made impact absorption member of the third aspect assumes the so-called impact absorption with respect to the axial compressive direction, and is used with respect to the impact which is received in the direction coaxial to the penetrating direction of the hollow structure of the impact absorption portion. In addition, the resin-made impact absorption member of the third aspect can be employed in various vehicular components for a simple structure.

EXAMPLES

Hereinafter, by illustrating examples, the present invention will be described in more detail. Furthermore, the present invention is not limited to the aspects of the following examples.

Each value in the examples is acquired by the following methods.

(1) Average Fiber Length of Reinforcing Fibers

The average fiber length of the reinforcing fibers in the fiber-reinforced resin material is an average value of the values obtained by measuring the lengths of 100 reinforcing fibers extracted randomly by a unit of 1 mm using a caliber after heating the fiber-reinforced resin material for 1 hour in a furnace at 500° C. and removing the thermoplastic resin. In a case where the average fiber length is less than 1 mm, the average fiber length is measured by a unit of 0.1 mm under an optical microscope. In addition, in a case where the average fiber length of the reinforcing fiber in the thermoplastic fiber-reinforced resin material is measured, the average fiber length is measured by a similar method after heating the fiber-reinforced resin material for 3 hours in a furnace at 500° C., and removing the thermosetting resin. In addition, in the specification, since the constant cut length is used, the number average fiber length and the weight average fiber length of the reinforcing fiber match each other.

(2) Volume Fraction of Reinforcing Fiber in Fiber-Reinforced Resin Material

The volume fraction of the reinforcing fiber in the fiber-reinforced resin material is calculated by acquiring a density of the fiber-reinforced resin material by a water substitution method, and by using a relationship between a density of only a reinforcing fiber measured in advance and a density of only a resin.

(3) Compressive Elastic Modulus and Compressive Strength of Fiber-Reinforced Resin Material The compressive elastic modulus and the compressive strength of the fiber-reinforced resin material are obtained by measuring a test piece which has been dried for 24 hours in a vacuum at 80° C. in advance in accordance with JIS K7076:1991.

(4) Fracture Elongation of Thermoplastic Resin

The fracture elongation of the thermoplastic resin is obtained by measuring the test piece which has been dried for 24 hours in a vacuum at 80° C. in advance in accordance with JIS K7162:1994.

(5) Impact Absorption Performance of Resin-Made Impact Absorption Member

Evaluation of the impact absorption performance of the resin-made impact absorption member is performed by using a drop hammer impact test machine IM10 manufactured by IMATEK, and by measuring the displacement required for initial impact load and the impact absorption when the impact energy of 2500 J is applied in the direction coaxial to the penetrating direction of the hollow structure of the resin-made impact absorption member. In addition, the impact absorption performance becomes excellent when the displacement required for both the initial impact load and the impact absorption decreases.

Reference Example 1

A fiber-reinforced resin material A was made by using a carbon fiber "Tenax (registered trademark)" STS40-24KS (average fiber diameter of 7 µm) manufactured by Toho Tenax Co., Ltd. and was cut to have 20 mm of average fiber length as the reinforcing fiber, by using nylon 6 resin A1030 (fracture elongation of 50%) manufactured by Unitika Ltd. as the thermoplastic resin, by making the carbon fibers two-dimensionally randomly oriented in the in-surface direction, by performing the mixing to make the fiber volume fraction with respect to the entire fiber-reinforced resin material 35 Vol %, and by heat-compressing the mixture for 5 minutes at pressure of 2.0 MPa by a press apparatus which had been heated to 280° C. The average fiber length of the obtained fiber-reinforced resin material A was approximately 20 mm, the fiber volume fraction was approximately 35 Vol %, the compressive elastic modulus was 25 GPa, and the compressive strength was 300 MPa.

Reference Example 2

A fiber-reinforced resin material B was made by the method similar to that in Reference Example 1 except that the reinforcing fiber was ground so that the average fiber length becomes approximately 0.5 mm and the fiber volume fraction was 15 Vol %. The average fiber length of the obtained fiber-reinforced resin material B was approximately 0.5 mm, the fiber volume fraction was approximately 15 Vol %, the compressive elastic modulus was 7 GPa, and the compressive strength was 110 MPa.

Reference Example 3

A fiber-reinforced resin material C was made by a method similar to that of Reference Example 1 except that the material was cut to have 200 mm of the average fiber length of the reinforcing fiber. The average fiber length of the obtained fiber-reinforced resin material C was approximately 200 mm, the fiber volume fraction was approximately 35 Vol %, the compressive elastic modulus was 35 GPa, and the compressive strength was 620 MPa.

Reference Example 4

A thermosetting fiber-reinforced resin prepreg was made by heating and mixing the carbon fiber "Tenax (registered trademark)" STS40-24KS (average fiber diameter of 7 µm) manufactured by Toho Tenax Co., Ltd. and was cut to have 20 mm of average fiber length as the reinforcing fiber, and bisphenol A type epoxy resin "jER (registered trademark)" 828 (fracture elongation of 5%) manufactured by Mitsubishi Chemical Corporation as the thermosetting resin, and then, by additionally kneading a modified aromatic amine-based hardener "jERCURE (registered trademark)" W manufactured by Mitsubishi Chemical Corporation as a hardener, and by extending the obtained composition by a coater in a shape of a flat plate. In addition, a ratio between the reinforcing fiber and the resin was adjusted so that the fiber volume fraction of the reinforcing fiber in the fiber-reinforced resin material becomes 35 Vol %. A fiber-reinforced resin material D was created by setting the obtained prepreg in the mold and by hardening the prepreg for 4 hours under a condition that the heating temperature is 180° C. and the pressure is 1.0 MPa. The average fiber length of the fiber-reinforced resin material D was approximately 20 mm, the fiber volume fraction was approximately 35 Vol %, the compressive elastic modulus was 23 GPa, and the compressive strength was 280 MPa.

Example 1

Figure 9A:
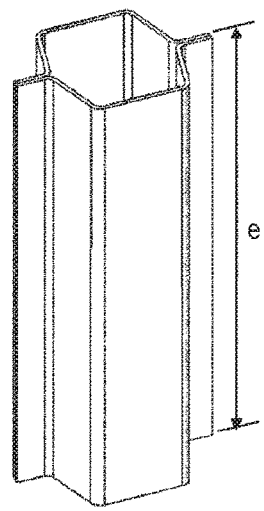
FIGS. 9A to 9B are schematic views of the impact absorption portion in the resin-made impact absorption member of Example 1.
Figure 9B:
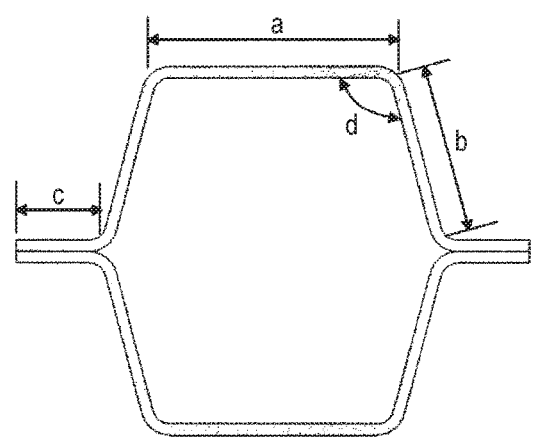

A resin-made impact absorption member made of a hexagonal impact absorption portion illustrated in FIGS. 9A and 9B was made by heating the fiber-reinforced resin material A of Reference Example 1 to 280° C., by performing the cold press molding, and further, by performing the oscillation welding with respect to the flange portion. In addition, FIG. 9B is a view illustrating a sectional shape in the direction orthogonal to the impact absorption direction of the impact absorption portion illustrated in FIG. 9A. Dimensions of each portion in the example were a=44 mm, b=31 mm, c=15 mm, d=105 degrees, and e=200 mm, and the thickness t1 of the outer cylindrical portion was uniformly 2.0 mm. The sectional shape in the direction orthogonal to the impact absorption direction was similar across the entire impact absorption direction. The maximum value of the ratio L1/t1 between the distance L1 from the position of the center of gravity to the outer cylindrical portion on the same section in the sectional shape in the direction orthogonal to the impact absorption direction of the impact absorption portion and the thickness t1 of the outer cylindrical portion, was 19, and the maximum value of the ratio L2/t2 between the side length L2 on each side of the hexagon and the average thickness t2 of the outer cylindrical portion which configures the side, was 22.

The manufactured resin-made impact absorption member was set in the drop hammer impact test machine so that the impact absorption direction becomes perpendicular, the impact energy of 2500 J was applied in the direction coaxial to the impact absorption direction, and as a result, the initial impact load was 105 kN, and the displacement required for the impact absorption was 45 mm.

Example 2

Figure 10A:
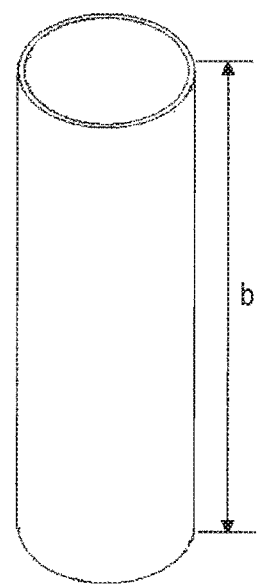
FIGS. 10A to 10B are schematic views of the impact absorption portion in the resin-made impact absorption member of Example 2.
Figure 10B:
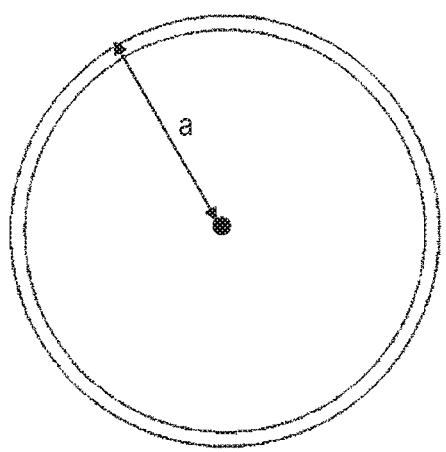

A resin-made impact absorption member made of a circular impact absorption portion illustrated in FIGS. 10A and 10B was made by heating the fiber-reinforced resin material A of Reference Example 1 to 280° C., by performing the cold press molding, and further, by performing the oscillation welding with respect to the flange portion. In addition, FIG. 10B is a view illustrating a sectional shape in the direction orthogonal to the impact absorption direction of the impact absorption portion illustrated in FIG. 10A. Dimensions of each portion in the example were a=34 mm and b=200 mm, and the thickness t1 of the outer cylindrical portion was uniformly 2.0 mm. The sectional shape in the direction orthogonal to the impact absorption direction was similar across the entire impact absorption direction. The maximum value of the ratio L1/t1 between the distance L1 from the position of the center of gravity to the outer cylindrical portion on the same section in the sectional shape in the direction orthogonal to the impact absorption direction of the impact absorption portion and the thickness t1 of the outer cylindrical portion, was 16.

The manufactured resin-made impact absorption member was set in the drop hammer impact test machine so that the impact absorption direction becomes perpendicular, the impact energy of 2500 J was applied in the direction coaxial to the impact absorption direction, and as a result, the initial impact load was 108 kN, and the displacement required for the impact absorption was 41 mm. In addition, an initial impact load ratio with respect to the initial impact load of Example 1 was 1.03, a displacement ratio with respect to the displacement required for the impact absorption of Example 1 was 0.91, and the impact absorption performance which is substantially equivalent to that of Example 1 was illustrated.

Example 3

Figure 11A:
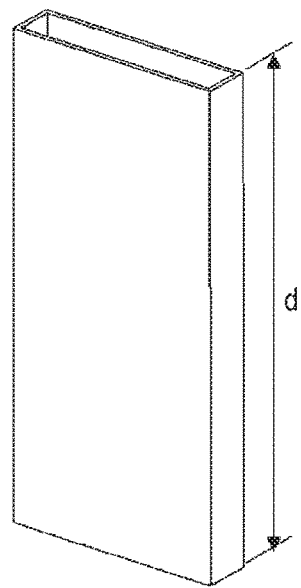
FIGS. 11A to 11B are schematic views of the impact absorption portion in the resin-made impact absorption member of Example 3.
Figure 11B:
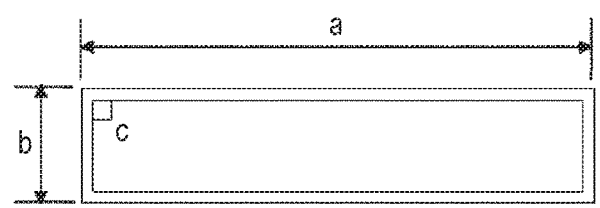

A resin-made impact absorption member made of a rectangular impact absorption portion illustrated in FIGS. 11A and 11B was made by heating the fiber-reinforced resin material A of Reference Example 1 to 280° C., by performing the cold press molding, and further, by performing the oscillation welding with respect to the flange portion. In addition, FIG. 11B is a view illustrating a sectional shape in the direction orthogonal to the impact absorption direction of the impact absorption portion illustrated in FIG. 11A. Dimensions of each portion in the example were a=90 mm, b=20 mm, c=90 degrees, and d=200 mm, and the thickness t1 of the outer cylindrical portion was uniformly 2.0 mm. The sectional shape in the direction orthogonal to the impact absorption direction was similar across the entire impact absorption direction. The maximum value of the ratio L1/t1 between the distance L1 from the position of the center of gravity to the outer cylindrical portion on the same section in the sectional shape in the direction orthogonal to the impact absorption direction of the impact absorption portion and the thickness t1 of the outer cylindrical portion, was 23, and the maximum value of the ratio L2/t2 between the side length L2 on each side of the rectangle and the average thickness t2 of the outer cylindrical portion which configures the side, was 45.

The manufactured resin-made impact absorption member was set in the drop hammer impact test machine so that the impact absorption direction becomes perpendicular, the impact energy of 2500 J was applied in the direction coaxial to the impact absorption direction, and as a result, the initial impact load was 110 kN, and the displacement required for the impact absorption was 66 mm. In addition, the initial impact load ratio with respect to the initial impact load of Example 1 was 1.05, the displacement ratio with respect to the displacement required for the impact absorption of Example 1 was 1.47, and a result that the displacement required for the impact absorption is slightly larger compared to Example 1 was achieved.

Example 4

A resin-made impact absorption member made of a hexagonal impact absorption portion illustrated in FIGS. 9A and 9B was made by heating the fiber-reinforced resin material A of Reference Example 1 to 280° C., by performing the cold press molding, and further, by performing the oscillation welding with respect to the flange portion. Dimensions of each portion in the example were a=66 mm, b=49.5 mm, c=22.5 mm, d=105 degrees, and e=200 mm, and the thickness t1 of the outer cylindrical portion was uniformly 1.5 mm. The sectional shape in the direction orthogonal to the impact absorption direction was similar across the entire impact absorption direction. The maximum value of the ratio L1/t1 between the distance L1 from the position of the center of gravity to the outer cylindrical portion on the same section in the sectional shape in the direction orthogonal to the impact absorption direction of the impact absorption portion and the thickness t1 of the outer cylindrical portion, was 38, and the maximum value of the ratio L2/t2 between the side length L2 on each side of the hexagon and the average thickness t2 of the outer cylindrical portion which configures the side, was 44.

The manufactured resin-made impact absorption member was set in the drop hammer impact test machine so that the impact absorption direction becomes perpendicular, the impact energy of 2500 J was applied in the direction coaxial to the impact absorption direction, and as a result, the initial impact load was 113 kN, and the displacement required for the impact absorption was 69 mm. In addition, the initial impact load ratio with respect to the initial impact load of Example 1 was 1.08, the displacement ratio with respect to the displacement required for the impact absorption of Example 1 was 1.53, and a result that the displacement required for the impact absorption is slightly larger compared to Example 1 was achieved.

Example 5

A thermoplastic resin base material E in which the average fiber length is 20 mm and the fiber volume fraction is approximately 20 Vol %, and a thermoplastic resin base material F in which the fiber volume fraction is 35 Vol % were made by using the carbon fiber "Tenax (registered trademark)" STS40-24KS (average fiber diameter of 7 μm) manufactured by Toho Tenax Co., Ltd. and is cut to have 20 mm of average fiber length as the reinforcing fiber, by using nylon 6 resin A1030 (fracture elongation of 50%) manufactured by Unitika Ltd. as the thermoplastic resin, by making the carbon fibers two-dimensionally randomly oriented in the in-surface direction, by performing the mixing to make the fiber volume fraction with respect to the entire fiber-reinforced resin material 20 Vol % and 35 Vol %, and by heat-compressing the mixture for 5 minutes at pressure of 2.0 MPa by the press apparatus which has been heated to 280° C. As a result of measuring the compressive strengths of the thermoplastic resin base materials E and F, each compressive strength was 150 MPa and 300 MPa.

A shaped product of the impact absorption base material in which a ratio of the lengths of both thermoplastic resin base materials E and F is 1:4 was obtained by combining the end portions in order of increasing the compressive strength toward the rear end side from the tip end side which receives the impact, and in order of the thermoplastic resin base materials E and F, by partially overlapping end portions of the thermoplastic resin base materials E and F, and by performing the cold press molding, after heating the obtained thermoplastic resin base materials E and F to 280° C. At this time, the average thickness of the thermoplastic resin base material E was 1.6 mm, and the average thickness of the thermoplastic resin base material F was 1.6 mm. In addition, the thermoplastic resin base materials E and F were combined so that the abundance in the thickness direction on the boundary thereof continuously changes. In addition, the shape of the shaped product was as illustrated in FIG. 22A, and dimensions of each portion were a1=50 mm, b1=100 mm, c1=12 mm, d1=80 degrees, and e1=150 mm. Next, by performing the oscillation welding with respect to the flange portion of the shaped product of the impact absorption base material, the resin-made impact absorption member made of the hexagonal impact absorption portion illustrated in FIG. 22B, was made.

In this manner, the manufactured resin-made impact absorption member was set in the drop hammer impact test machine so that the impact absorption direction becomes perpendicular, the compression load of 500 J was applied in the direction coaxial to the impact absorption direction, and as a result, the initial impact load was 34.4 kN, and the displacement required for the impact absorption was 39.4 mm.

In the resin-made impact absorption member of Example 5, the compressive elastic modulus of the thermoplastic resin base material E was 12 GPa, the compressive elastic modulus of the thermoplastic resin base material F was 25 GPa, and the maximum value of L1/t1 was 39.

Example 6

A shaped product of the impact absorption base material was obtained by heating the thermoplastic resin base material F of Example 5 to 280° C. and by performing the cold press. Next, a resin-made impact absorption member made of the hexagonal impact absorption portion having the same shape as that of Example 5, was made by performing the oscillation welding with respect to the flange portion of the shaped product of the impact absorption base material. The manufactured resin-made impact absorption member was set in the drop hammer impact test machine so that the impact absorption direction becomes perpendicular, the compression load of 500 J was applied in the direction coaxial to the impact absorption direction, and as a result, the initial impact load was 48.6 kN, and the displacement required for the impact absorption was 63.0 mm.

In the resin-made impact absorption member of Example 6, the compressive elastic modulus of the thermoplastic resin base material F was 25 GPa, and the maximum value of L1/t1 was 39.

Example 7

A fiber-reinforced resin material G was made by using the PAN-based carbon fiber "Tenax (registered trademark)" STS40-24KS (average fiber diameter of 7 μm) manufactured by Toho Tenax Co., Ltd. and was cut to have 20 mm of average fiber length as the reinforcing fiber, by using nylon 6 resin A1030 (fracture elongation of 50%) manufactured by Unitika Ltd. as the thermoplastic resin, by making the carbon fibers two-dimensionally randomly oriented in the in-surface direction, by performing the mixing to make the fiber volume fraction with respect to the entire fiber-reinforced resin material 35 Vol %, and by heat-compressing the mixture for 5 minutes at pressure of 2.0 MPa by the press apparatus which has been heated to 280° C. The average fiber length of the obtained fiber-reinforced resin material G was approximately 20 mm, the compressive elastic modulus was 25 GPa, the compressive strength was 300 MPa, and the density was 1300 kg/m$^3$.

The resin shaped product and the impact absorption auxiliary portion were formed by using the fiber-reinforced resin material G, by heating the fiber-reinforced resin material G to 280° C., and by performing the cold press molding. Next, the resin-made impact absorption member made of the impact absorption portion illustrated in FIG. 34 was made by performing the oscillation welding with respect to the flange portion of the resin shaped product, and by making the impact absorption auxiliary portion to cover the boundary portion configured of the flange portion. Dimensions of each portion of the impact absorption portion in the example were m=36.32 mm, n=12 mm, p=90 mm, q=30 mm, r=105 degrees, and s=105 degrees. In addition, the thickness of the resin shaped product was uniformly 2 mm. Furthermore, the thickness of the impact absorption auxiliary portion was uniformly 1 mm, and the sectional shape in the direction orthogonal to the impact absorption direction was substantially similar across the entire impact absorption direction. The contents of the reference numerals illustrating the dimensions of each portion of the impact absorption portion were as illustrated in FIG. 33.

When the impact absorption direction is perpendicular in the resin-made impact absorption member, and the impact energy of 6000 J is applied in the direction coaxial to the impact absorption direction, the initial impact load is 132 kN, and the displacement required for the impact absorption is 109 mm. In addition, the impact absorption performance is 66.4 J/g.

In the resin-made impact absorption member of Example 7, the maximum value of L1/t1 was 17, and the maximum value of L2/t2 was 21.

Example 8

The resin-made impact absorption member was made by the method similar to that of Example 7 except that the thickness of the impact absorption auxiliary portion was 2 mm.

When the impact absorption direction is perpendicular in the resin-made impact absorption member, and the impact energy of 6000 J is applied in the direction coaxial to the impact absorption direction, the initial impact load is 156 kN, and the displacement required for the impact absorption is 90 mm. In addition, the impact absorption performance is 69.9 J/g.

Example 9

The resin-made impact absorption member was made by the method similar to that of Example 7 except that the thickness of the impact absorption auxiliary portion was 4 mm.

When the impact absorption direction is perpendicular in the resin-made impact absorption member, and the impact energy of 6000 J is applied in the direction coaxial to the impact absorption direction, the initial impact load is 198 kN, and the displacement required for the impact absorption is 68 mm. In addition, the impact absorption performance is 72.1 J/g.

Example 10

Figure 35:
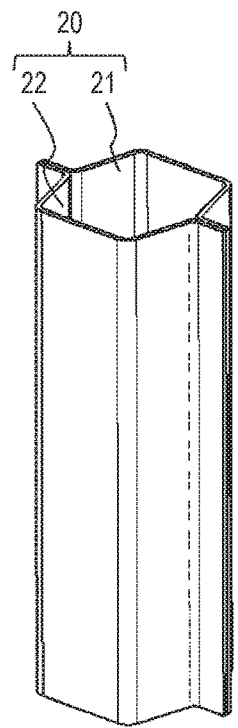
FIG. 35 is a schematic view illustrating an example of an impact absorption portion in the present invention.

A resin shaped product was made by heating the fiber-reinforced resin material G of Example 7 to 280° C. and by performing the cold press molding. Next, the resin-made impact absorption member made of the impact absorption portion illustrated in FIG. 35 was made by performing the oscillation welding with respect to the flange portion of the resin shaped product. In the example, the impact absorption auxiliary portion was not used. Dimensions of each portion of the impact absorption portion in the example were m=36.32 mm, n=12 mm, p=90 mm, q=30 mm, r=105 degrees, and s=105 degrees. In addition, the thickness of the resin shaped product was uniformly 2 mm.

When the impact absorption direction is perpendicular in the resin-made impact absorption member, and the impact energy of 6000 J is applied in the direction coaxial to the impact absorption direction, the initial impact load is 114 kN, and the displacement required for the impact absorption is 141 mm. In addition, the impact absorption performance is 59.8 J/g.

Examples 7 to 9 correspond to an example of the third aspect.

Comparison Example 1

A resin-made impact absorption member made of the hexagonal impact absorption portion illustrated in FIGS. 9A and 9B was made by heating the fiber-reinforced resin material A of Reference Example 1 to 280° C., by performing the cold press molding, and further, by performing the oscillation welding with respect to the flange portion. Dimensions of each portion in the comparison example were a=88 mm, b=62 mm, c=15 mm, d=105 degrees, and e=200 mm, and the thickness t1 of the outer cylindrical portion was uniformly 1.0 mm. The sectional shape in the direction orthogonal to the impact absorption direction was similar across the entire impact absorption direction. The maximum value of the ratio L1/t1 between the distance L1 from the position of the center of gravity to the outer cylindrical portion on the same section in the sectional shape in the direction orthogonal to the impact absorption direction of the impact absorption portion and the thickness t1 of the outer cylindrical portion, was 76, and the maximum value of the ratio L2/t2 between the side length L2 on each side of the hexagon and the average thickness t2 of the outer cylindrical portion which configures the side, was 88.

The manufactured resin-made impact absorption member was set in the drop hammer impact test machine so that the impact absorption direction becomes perpendicular, the impact energy of 2500 J was applied in the direction coaxial to the impact absorption direction, and as a result, the initial impact load was 105 kN, and the displacement required for the impact absorption was 180 mm. In addition, the initial impact load ratio with respect to the initial impact load of Example 1 was 1.00, the displacement ratio with respect to the displacement required for the impact absorption of Example 1 was 4.00, and a result that the displacement required for the impact absorption was 4 times greater than that of Example 1, is achieved.

Comparison Example 2

A resin-made impact absorption member made of the hexagonal impact absorption portion illustrated in FIGS. 9A and 9B was made by heating the fiber-reinforced resin material A of Reference Example 1 to 280° C., by performing the cold press molding, and further, by performing the oscillation welding with respect to the flange portion. Dimensions of each portion in the comparison example were a=66 mm, b=49.5 mm, c=22.5 mm, d=105 degrees, and e=200 mm, and the thickness t1 of the outer cylindrical portion was uniformly 1.2 mm. The sectional shape in the direction orthogonal to the impact absorption direction was similar across the entire impact absorption direction. The maximum value of the ratio L1/t1 between the distance L1 from the position of the center of gravity to the outer cylindrical portion on the same section in the sectional shape in the direction orthogonal to the impact absorption direction of the impact absorption portion and the thickness t1 of the outer cylindrical portion, was 47.5, and the maximum value of the ratio L2/t2 between the side length L2 on each side of the hexagon and the average thickness t2 of the outer cylindrical portion which configures the side, was 55.

The manufactured resin-made impact absorption member was set in the drop hammer impact test machine so that the impact absorption direction becomes perpendicular, the impact energy of 2500 J was applied in the direction coaxial to the impact absorption direction, and as a result, the initial impact load was 102 kN, and the displacement required for the impact absorption was 104 mm. In addition, the initial impact load ratio with respect to the initial impact load of Example 1 was 0.97, the displacement ratio with respect to the displacement required for the impact absorption of Example 1 was 2.31, and a result that the displacement required for the impact absorption was 2.31 times greater than that of Example 1, is achieved.

Comparison Example 3

A resin-made impact absorption member having the same shape was made by using the fiber-reinforced resin material B of Reference Example 2 by a method similar to that of Example 1. The manufactured resin-made impact absorption member was set in the drop hammer impact test machine so that the impact absorption direction becomes perpendicular, the impact energy of 2500 J was applied in the direction coaxial to the impact absorption direction, and as a result, the initial impact load was 38 kN, and the displacement required for the impact absorption was 165 mm. In addition, the initial impact load ratio with respect to the initial impact load of Example 1 was 0.36, the displacement ratio with respect to the displacement required for the impact absorption of Example 1 was 3.67, and a result that the impact load was excellent being 0.36 times greater than that of Example 1, and the displacement required for the impact absorption was 3.67 times greater than that of Example 1, is achieved.

Comparison Example 4

A resin-made impact absorption member having the same shape was made by using the fiber-reinforced resin material C of Reference Example 3 by a method similar to that of Example 1. The manufactured resin-made impact absorption member was set in the drop hammer impact test machine so that the impact absorption direction becomes perpendicular, the impact energy of 2500 J was applied in the direction coaxial to the impact absorption direction, and as a result, the initial impact load was 220 kN, and the displacement required for the impact absorption was 28 mm. In addition, the initial impact load ratio with respect to the initial impact load of Example 1 was 2.10, the displacement ratio with respect to the displacement required for the impact absorption of Example 1 was 0.62, and a result that the displacement required for the impact absorption was excellent being 0.62 times greater than that of Example 1, and is excellent, and the initial impact load was 2.10 times greater than that of Example 1, is achieved.

Comparison Example 5

A thermosetting resin-made impact absorption member having the same shape as that of Example 1 was made by setting the thermosetting fiber-reinforced resin prepreg obtained in Reference Example 4 in the mold, and by hardening the prepreg for 4 hours under a condition that the heating temperature is 180° C. and the pressure is 1.0 MPa. The manufactured resin-made impact absorption member was set in the drop hammer impact test machine so that the impact absorption direction becomes perpendicular, the impact energy of 2500 J was applied in the direction coaxial to the impact absorption direction, and as a result, the initial impact load was 99 kN, and the displacement required for the impact absorption was 91 mm. In addition, the initial impact load ratio with respect to the initial impact load of Example 1 was 0.94, the displacement ratio with respect to the displacement required for the impact absorption of Example 1 was 2.02, and a result that the displacement required for the impact absorption was 2.02 times greater than that of Example 1, is achieved.

Hereinafter, as a reference, an example and a comparison example of the second aspect will be described.

Examples 5 and 6 correspond to the example of the second aspect.

Reference Example 5

A shaped product of the impact absorption base material was obtained by heating the thermoplastic resin base material F of Example 5 to 280° C., by inputting the fiber-reinforced resin material F into a mold in advance which is designed so that the thicknesses of the impact absorption base material are 1.3 mm and 1.6 mm toward the rear end side from the tip end side which receives the impact, and further, the ratio of the lengths toward the rear end side from the tip end side which receives the impact is 1:4, and by performing the cold press molding. Next, a resin-made impact absorption member made of the hexagonal impact absorption portion having the same shape as that of Example 5, was made by performing the oscillation welding with respect to the flange portion of the shaped product of the impact absorption base material. The manufactured resin-made impact absorption member was set in the drop hammer impact test machine so that the impact absorption direction becomes perpendicular, the compression load of 500 J was applied in the direction coaxial to the impact absorption direction, and as a result, the initial impact load was 35.9 kN, and the displacement required for the impact absorption was 38.5 mm.

Comparison Example 6

An A5052 (aluminum)-made impact absorption member made of the hexagonal impact absorption portion in which the thickness of the outer cylindrical portion having the same shape as that of Example 5 is uniformly 1.5 mm, was made by performing the press molding with respect to A5052 (aluminum), and further, by performing spot welding with respect to the flange portion. The manufactured aluminum-made impact absorption member was set in the drop hammer impact test machine so that the impact absorption direction becomes perpendicular, the compression load of 500 J was applied in the direction coaxial to the impact absorption direction, and as a result, the initial impact load was 108.3 kN, and the displacement required for the impact absorption was 10.9 mm.

From the result of Example 5, Example 6, and Comparison Example 6, it was confirmed and verified that the resin-made impact absorption member of the second aspect can suppress the initial impact load to be low and suppress the displacement required for the impact absorption to be low, compared to the resin-made impact absorption member which uses the impact absorption base material made of a single thermoplastic resin base material. In addition, the resin-made impact absorption member of the second aspect can obtain the performance which is substantially equivalent to that of the resin-made impact absorption member (Reference Example 5) in which the thickness changes for changing the compressive strength. Furthermore, the weight of the resin-made impact absorption member of the second aspect was approximately a half compared to that of the impact absorption member of Comparison Example 6 made of A5052 (aluminum). In addition, while the entire test body of the impact absorption member of Comparison Example 6 in which the maximum displacement amount is small was modified to be buckled, the damage of the resin-made impact absorption member of the second aspect generated at the tip end reaches the adjacent portion, the damage spread to the adjacent portion, the damage advanced in order in the load direction, and accordingly, the impact can be absorbed. Therefore, as much as the overlap between the thermoplastic resin base materials is not generated, it can be ascertained that the entire length of the resin-made impact absorption member can be efficiently used, and the entire length can be shortened.

INDUSTRIAL APPLICABILITY

By absorbing the impact energy input to one end by the impact absorption portion, the resin-made impact absorption member of the present invention can be used for suppressing the impact to the other end, and for example, can be used in the impact absorption apparatus of a vehicle or the like.

The present invention is described with reference to the detail or specific embodiment, but it is apparent for those skilled in the art that various changes or corrections can be added without departing from the range of the technical idea of the present invention.

The present application is based on Japanese Patent Application No. 2014-021453 filed on Feb. 6, 2014, Japanese Patent Application No. 2014-052051 filed on Mar. 14, 2014, and Japanese Patent Application No. 2014-052052 filed on Mar. 14, 2014, and the contents thereof are incorporated herein by reference

REFERENCE SIGNS LIST

1 IMPACT ABSORPTION PORTION
2 OUTER CYLINDRICAL PORTION
3 HOLLOW PORTION
4 SECTION IN DIRECTION ORTHOGONAL TO THE IMPACT ABSORPTION DIRECTION OF IMPACT ABSORPTION PORTION
5 POINT ON OUTER CYLINDRICAL PORTION ON ARBITRARY SECTION 4
6 CENTER ON ARBITRARY SECTION 4
7 SIDE OF OUTER CYLINDRICAL PORTION ON ARBITRARY SECTION 4
X IMPACT ABSORPTION DIRECTION
10 RESIN-MADE IMPACT ABSORPTION MEMBER
11 IMPACT ABSORPTION BASE MATERIAL
11a, 11b, 11c THERMOPLASTIC RESIN BASE MATERIAL
12 IMPACT ABSORPTION PORTION
13 BOTTOM PORTION
14 LID PORTION
100 IMPACT ABSORPTION PORTION
20 HOLLOW IMPACT ABSORPTION BODY
21, 22 RESIN SHAPED PRODUCT
21a BOUNDARY PORTION
21b OPENING PORTION
30 IMPACT ABSORPTION AUXILIARY PORTION
31 PROJECTED SHAPE
32 PROJECTED PORTION
33 LINEARLY RECESSED PORTION

The invention claimed is:

1. A resin-made impact absorption member comprising:
an impact absorption portion which has a hollow structure including an outer tubular portion and a hollow portion, the impact absorption portion including a plurality of resin shaped products including a fiber-reinforced resin material containing reinforcing fibers and a thermoplastic resin, the resin shaped products having flange portions that come into contact with each other to form a boundary portion of combined resin products; and impact absorption auxiliary portions including a resin material, the impact absorption auxiliary portions being formed to cover the boundary portion, wherein the reinforcing fibers have an average fiber length of 1 mm to 100 mm, the thermoplastic resin has a fracture elongation of equal to or greater than 10%, the fiber-reinforced resin material has a compressive elastic modulus of equal to or greater than 10 GPa and a compressive strength of 150 MPa to 500 MPa, wherein, in the impact absorption portion, a maximum value of a ratio (L1/t1) of a distance (L1) from a position of the center of gravity to the outer tubular portion on a same section in a sectional shape in a direction orthogonal to an impact absorption direction, to a thickness (t1) of the outer tubular portion, is equal to or less than 40, and wherein the impact absorption auxiliary portions are formed as components that are independent from the impact absorption portion.

2. The resin-made impact absorption member according to claim 1,
wherein the sectional shape in the direction orthogonal to the impact absorption direction of the impact absorption portion is a polygon, and a maximum value of a ratio (L2/t2) between a side length (L2) on each side of the polygon and an average thickness (t2) of the outer tubular portion which configures the side, is equal to or less than 40.

3. The resin-made impact absorption member according to claim 1,
wherein the impact absorption portion is configured by combining hat shapes having the flange portions.

4. The resin-made impact absorption member according to claim 1,
wherein the sectional shape in the direction orthogonal to the impact absorption direction of the impact absorption portion is a uniform shape across the entire impact absorption direction.

5. The resin-made impact absorption member according to claim 1,
wherein the impact absorption portion includes a single fiber-reinforced resin material.

6. The resin-made impact absorption member according to claim 1,
wherein a sectional area of the impact absorption auxiliary portions in the direction perpendicular to the impact absorption direction of the impact absorption portion, is different from a sectional area in the impact absorption direction.

7. The resin-made impact absorption member according to claim 6,
wherein the impact absorption auxiliary portions are formed so that the sectional areas increase along the impact absorption direction.

8. The resin-made impact absorption member according to claim 1,
wherein the boundary portion is covered with the impact absorption auxiliary portions so as to have a space between an end surface of the boundary portion and inner surfaces of the impact absorption auxiliary portions, at least at a part thereof.

9. The resin-made impact absorption member according to claim 1,
wherein the flange portions which form the boundary portion are joined to each other.

10. A vehicular component comprising a resin-made impact absorption member according to claim 1.

11. The resin-made impact absorption member according to claim 1,
wherein the impact absorption auxiliary portions are replaceable.

12. The resin-made impact absorption member according to claim 1,
wherein the impact absorption auxiliary portions are fitted to the boundary portion to cover the boundary portion.

* * * * *